US010202146B2

(12) United States Patent
Endo et al.

(10) Patent No.: US 10,202,146 B2
(45) Date of Patent: Feb. 12, 2019

(54) STEERING CONTROL DEVICE AND STEERING-ASSISTING TORQUE CONTROL METHOD THEREOF

(71) Applicant: MITSUBISHI ELECTRIC CORPORATION, Chiyoda-ku (JP)

(72) Inventors: Masaya Endo, Chiyoda-ku (JP); Hidetoshi Ikeda, Chiyoda-ku (JP); Yoshihiko Kinpara, Chiyoda-ku (JP); Hiroaki Kitano, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 140 days.

(21) Appl. No.: 15/123,730

(22) PCT Filed: Mar. 19, 2015

(86) PCT No.: PCT/JP2015/058263
§ 371 (c)(1),
(2) Date: Sep. 6, 2016

(87) PCT Pub. No.: WO2015/163051
PCT Pub. Date: Oct. 29, 2015

(65) Prior Publication Data
US 2017/0015351 A1 Jan. 19, 2017

(30) Foreign Application Priority Data

Apr. 25, 2014 (JP) .................. 2014-091416

(51) Int. Cl.
*B62D 5/04* (2006.01)
*B62D 6/00* (2006.01)
(Continued)

(52) U.S. Cl.
CPC .............. *B62D 6/00* (2013.01); *B62D 5/046* (2013.01); *B62D 5/0463* (2013.01);
(Continued)

(58) Field of Classification Search
None
See application file for complete search history.

(56) References Cited

U.S. PATENT DOCUMENTS 5,473,539 A * 12/1995 Shimizu ............... B62D 5/0463
180/446
6,450,287 B1 9/2002 Kurishige et al.
(Continued)

FOREIGN PATENT DOCUMENTS

JP 5-301575 11/1993
JP 2002-104210 4/2002
(Continued)

OTHER PUBLICATIONS

International Search Report dated Jun. 9, 2015 in PCT/JP2015/058263 filed Mar. 19, 2015.
(Continued)

*Primary Examiner* — Kevin P Mahne
(74) *Attorney, Agent, or Firm* — Oblon, McClelland, Maier & Neustadt, L.L.P.

(57) ABSTRACT

A steering control device capable of causing a steering torque to follow a target steering torque when a driver holds a steering wheel for steering, and making an adjustment so that the steering wheel returns to a neutral position at an appropriate speed, when the driver releases his or her hands from the steering wheel. A motor is controlled based on a motor steering assist torque, which is a sum of a first steering assist torque, which is proportional to an integral value of a deviation between the target steering torque and the steering torque, and a second steering assist torque, which is proportional to a motor rotational angular velocity and acting in a direction of suppressing a return speed of the steering wheel when the steering wheel returns to the neutral position.

15 Claims, 18 Drawing Sheets

(51) Int. Cl.
*B62D 6/10* (2006.01)
*B62D 15/02* (2006.01)
*B62D 6/02* (2006.01)

(52) U.S. Cl.
CPC ......... B62D 5/0466 (2013.01); B62D 5/0472 (2013.01); *B62D 5/04* (2013.01); *B62D 5/0409* (2013.01); *B62D 6/02* (2013.01); *B62D 6/10* (2013.01); *B62D 15/0215* (2013.01); *B62D 15/0235* (2013.01)

(56) References Cited

U.S. PATENT DOCUMENTS

| | | | |
|---|---|---|---|
| 2002/0060538 A1 | 5/2002 | Hara et al. | |
| 2004/0140148 A1* | 7/2004 | Nishizaki | B62D 5/0463 180/443 |
| 2007/0273317 A1* | 11/2007 | Endo | B62D 5/0466 318/432 |
| 2008/0167780 A1 | 7/2008 | Suzuki et al. | |
| 2009/0266641 A1 | 10/2009 | Ehara et al. | |
| 2010/0292896 A1* | 11/2010 | Watanabe | B62D 5/0466 701/41 |
| 2011/0112724 A1 | 5/2011 | Kariatsumari et al. | |
| 2013/0060426 A1* | 3/2013 | Watanabe | B62D 5/0463 701/42 |
| 2013/0060427 A1 | 3/2013 | Kataoka et al. | |
| 2014/0041958 A1 | 2/2014 | Iijima et al. | |
| 2014/0058630 A1* | 2/2014 | Kezobo | B62D 5/0472 701/42 |
| 2014/0365077 A1* | 12/2014 | Kariatsumari | B62D 5/0472 701/41 |
| 2015/0066306 A1* | 3/2015 | Kodera | B62D 5/0466 701/43 |
| 2015/0344066 A1* | 12/2015 | Tsubaki | B62D 1/286 701/41 |
| 2016/0059885 A1* | 3/2016 | Tsubaki | B62D 5/0472 701/42 |

FOREIGN PATENT DOCUMENTS

| | | |
|---|---|---|
| JP | 2002-120743 | 4/2002 |
| JP | 2002-145101 | 5/2002 |
| JP | 2003-81112 | 3/2003 |
| JP | 2006-117181 | 5/2006 |
| JP | 2006-281882 | 10/2006 |
| JP | 2009-262652 | 11/2009 |
| JP | 2010-58601 | 3/2010 |
| JP | 2010-264913 A | 11/2010 |
| JP | 2011-109733 | 6/2011 |
| JP | 2013-189123 | 9/2013 |

OTHER PUBLICATIONS

Extended European Search Report dated Jan. 25, 2018 in Patent Application No. 15782525.8. 9 pages.

* cited by examiner

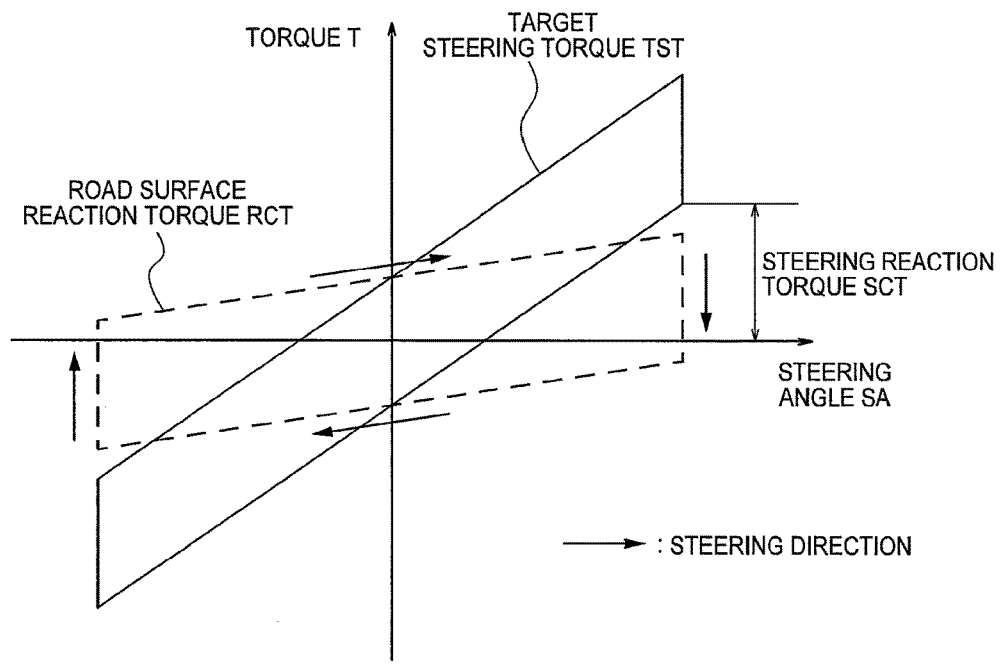
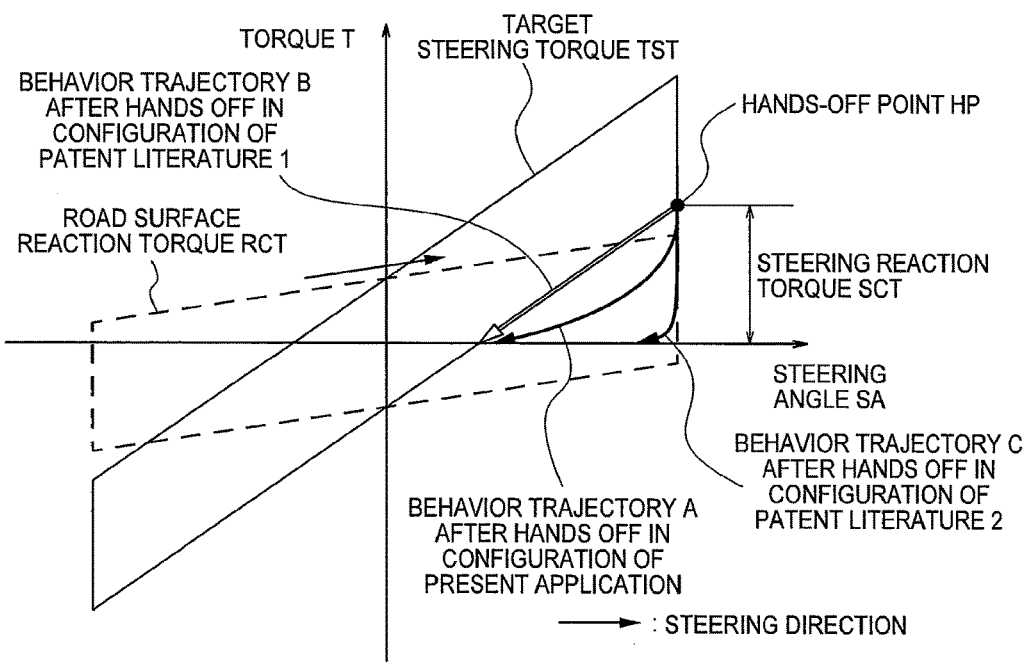

STEERING CONTROL DEVICE AND STEERING-ASSISTING TORQUE CONTROL METHOD THEREOF

TECHNICAL FIELD

The present invention relates to a steering control device and the like, which are configured to adjust a steering torque required for a driver by generating a steering assist torque with a motor.

BACKGROUND ART

In a related-art steering control device, there is proposed a steering control device, including: steering torque detection means for detecting a steering torque of steering; and target steering torque setting means for setting a target steering torque based on a steering situation, in which a steering assist torque of a motor is generated so that the steering torque detected by the steering torque detection means follows the target steering torque set by the target steering torque setting means (e.g., Patent Literature 1 and 2).

CITATION LIST

Patent Literature

[PTL 1] JP 05-301575 A (FIG. 1)
[PTL 2] JP 2002-120743 A (FIG. 10)

SUMMARY OF INVENTION

Technical Problem

This kind of steering control device is configured to set an assist steering torque of a motor based on a deviation between a target steering torque set by target steering torque setting means and a steering torque detected by steering torque detection means. However, this steering control device is designed by assuming only a case where a driver holds a steering wheel for steering. Accordingly, there is a problem in that, under a hands-off state in which the driver releases his or her hands from the steering wheel, the steering wheel does not return to a neutral position, or over returns to the neutral position.

The present invention has been made to solve the above-mentioned problem, and it is an object of the present invention to provide a steering control device and a steering assist torque control method, which are capable of causing a steering torque to follow a target steering torque, when a driver holds a steering wheel for steering, thereby achieving smooth steering, and of returning the steering to a neutral position at an appropriate speed, when the driver releases his or her hands from the steering wheel, thereby being able to achieve satisfactory steering feelings even in a steering state and in a hands-off state.

Solution to Problem

According to the present invention, there are provided a steering control device and the like. The steering control device includes: a motor configured to apply a steering assist torque to a steering shaft; a steering torque detection unit configured to detect a steering torque acting on the steering shaft; a target steering torque setting unit configured to set a target steering torque; a first steering assist torque calculation unit configured to calculate a first steering assist torque that is proportional to an integral value of a deviation between the target steering torque and the steering torque; a motor rotational angular velocity detection unit configured to detect a rotational angular velocity of the motor; a second steering assist torque calculation unit configured to calculate a second steering assist torque that is proportional to the rotational angular velocity of the motor and acting in a direction of suppressing a return speed of a steering wheel when the steering wheel returns to a neutral position; an addition unit configured to calculate a motor steering assist torque of the motor based on a sum of the first steering assist torque and the second steering assist torque; a current driver configured to control current of the motor so that the steering assist torque of the motor matches the calculated motor steering assist torque.

Advantageous Effects of Invention

According to the present invention, it is possible to cause the steering torque to follow the target steering torque when the driver holds the steering wheel for steering, thereby achieving smooth steering, and to return the steering to the neutral position at an appropriate speed, when the driver releases his or her hands from the steering wheel, because the steering torque follows the target steering torque with an appropriate following deviation, thereby being able to achieve satisfactory steering feelings even in a steering state and in a hands-off state.

BRIEF DESCRIPTION OF DRAWINGS

FIG. 4 is a graph for showing a relationship among a steering angle, a road surface reaction torque, and a target steering torque when a driver operating the steering control device according to the first embodiment of the present invention steers a steering wheel.

FIG. 5 is a graph for showing a relationship between the steering angle and the steering torque when the driver operating the steering control device according to the first embodiment of the present invention releases his or her hands from the steering wheel.

DESCRIPTION OF EMBODIMENTS

Now, a steering control device and the like according to each of embodiments of the present invention are described with reference to the drawings.

Note that, in each of the embodiments, the same or corresponding portions are denoted by the same reference symbols, and the overlapping description thereof is omitted.

First Embodiment

Figure 1:
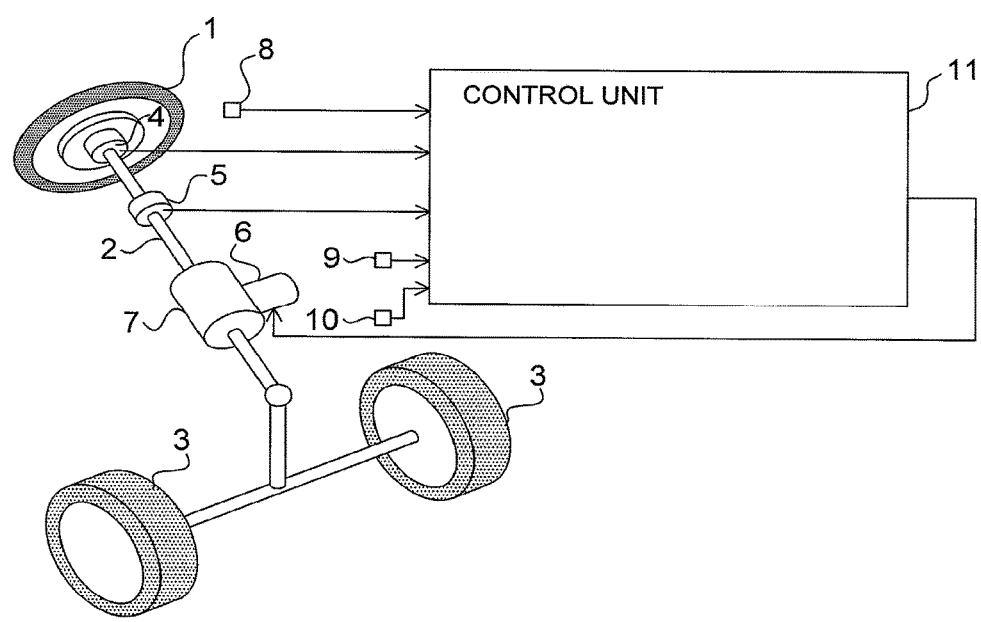
FIG. 1 is a configuration diagram for illustrating a steering control device according to a first embodiment of the present invention.

FIG. 1 is a configuration diagram for illustrating a steering control device according to an embodiment of the present invention. Left and right steered wheels 3 are steered in response to rotation of a steering shaft 2 coupled to a steering wheel 1. A steering angle sensor 4 configured to detect a steering angle is arranged on the steering wheel 1. Further, a torque sensor 5 serving as a steering torque detection unit is arranged on the steering shaft 2, and is configured to detect a steering torque acting on the steering shaft 2. A motor 6 is coupled to the steering shaft 2 via a speed reducer 7, and a steering assist torque generated by the motor 6 can be applied to the steering shaft 2. A vehicle speed sensor 8 serving as a vehicle speed detection unit is configured to detect a vehicle speed of a vehicle. Further, a current sensor 9 is configured to detect current flowing through the motor 6. A motor rotational angle sensor 10 is configured to detect a rotational angle of the motor 6.

A control unit 11 is configured to calculate a steering assist torque generated by the motor 6, and to control current necessary for the motor 6 to generate the steering assist torque. The control unit 11 includes a microcomputer (parts other than a current driver 12 within the control unit 11 of FIG. 2) having memories (not shown) including a ROM and a RAM, and the current driver 12 configured to cause motor current to flow (refer to FIG. 2).

Figure 2:
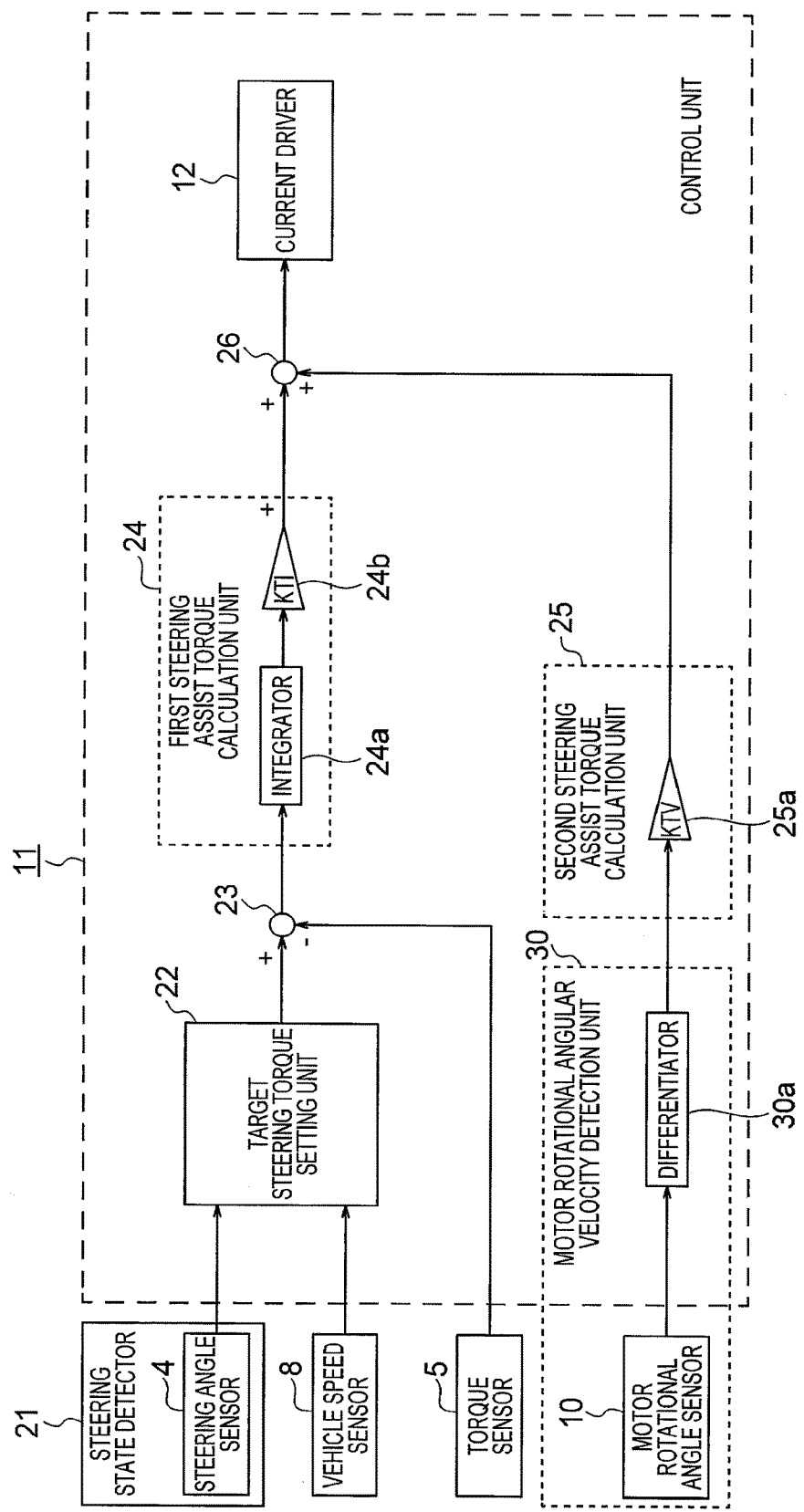
FIG. 2 is a block diagram for illustrating a configuration of a main unit of the steering control device according to the first embodiment of the present invention.
Figure 3:
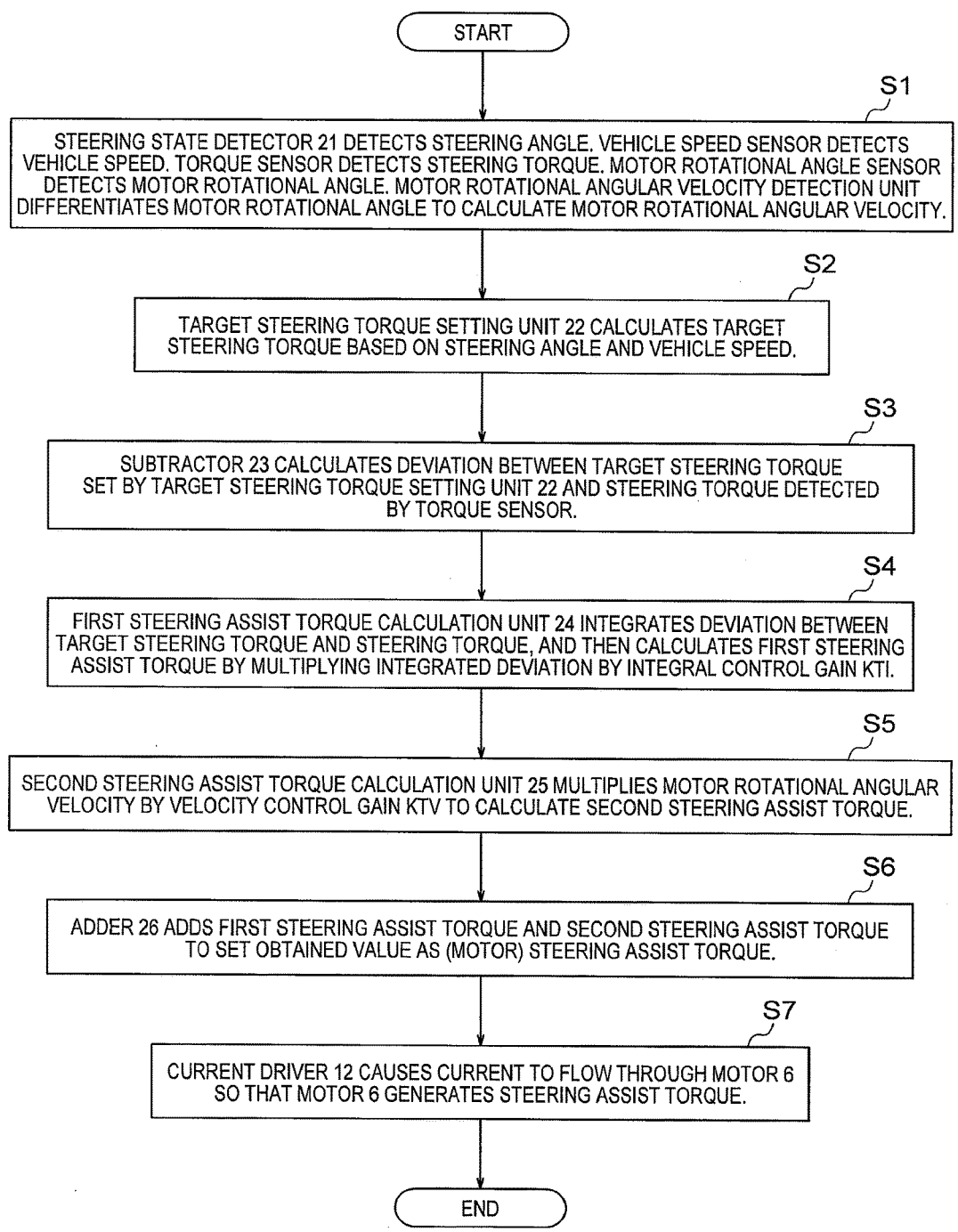
FIG. 3 is a flowchart for illustrating an operation of the main unit of the steering control device according to the first embodiment of the present invention.

Next, a description is given of calculation of a steering assist torque by the control unit 11, which is a main unit of the present invention, with reference to a block diagram of FIG. 2 for illustrating a configuration of the main unit and a flowchart of FIG. 3 for illustrating an operation of the main unit. The operation illustrated in the flowchart is repeatedly executed at a control cycle, which is a set time period.

In Step S1, the steering angle sensor 4, which is a steering state detector 21 configured to detect a state amount relating to a lateral motion of the vehicle, is used to detect a steering angle.

The vehicle speed sensor 8 detects a vehicle speed.

The torque sensor 5 detects a steering torque.

The motor rotational angle sensor 10 detects a motor rotational angle. A motor rotational angular velocity detection unit 30 differentiates the motor rotational angle detected by the motor rotational angle sensor 10 with a differentiator 30a to calculate a motor rotational angular velocity.

In Step S2, a target steering torque setting unit 22 calculates a first target steering torque based on the detected steering angle and vehicle speed.

In Step S3, a subtractor 23 calculates a deviation between the target steering torque set by the target steering torque setting unit 22 and the steering torque detected by the torque sensor 5.

In Step S4, a first steering assist torque calculation unit 24 integrates the deviation between the target steering torque and the steering torque with an integrator 24a, and then calculates a first steering assist torque by multiplying the integrated deviation by an integral control gain KTI with a multiplier 24b.

In Step S5, a second steering assist torque calculation unit 25 multiplies the motor rotational angular velocity by a velocity control gain KTV with a multiplier 25a to calculate a second steering assist torque.

In Step S6, an adder 26 serving as an addition unit adds the first steering assist torque and the second steering assist torque to set the obtained value as a motor steering assist torque for controlling the motor 6 (hereinafter also simply referred to as "steering assist torque").

In Step S7, the current driver 12 causes current of the motor 6 to flow so that the motor 6 generates the motor steering assist torque, that is, controls and causes the current to flow through the motor 6 in accordance with the acquired motor steering assist torque.

Next, a description is given of an effect of the steering control device thus configured.

The steering control device of the vehicle needs to consider both of a state in which a driver holds the steering wheel 1 for steering and a hands-off state in which the driver releases his or her hands from the steering wheel 1.

For example, when the vehicle is traveling at a low (slow) speed, a road surface reaction torque caused between the steered wheels 3 and a road surface is inclined to return the steering wheel 1 to a neutral position, but the steering wheel 1 does not return to the neutral position when the road surface reaction torque is smaller than a friction inherent in a steering mechanism.

FIG. 4 is a graph for showing a relationship among a steering angle SA, a road surface reaction torque RCT, and a target steering torque TST when the driver operating the steering control device according to the first embodiment of the present invention steers the steering wheel.

In FIG. 4, T, SA, RCT, TST, and SCR indicate the torque, the steering angle, the road surface reaction torque, the target steering torque, and the steering reaction torque, respectively.

In FIG. 4, the broken line indicates a relationship between the steering angle SA and the road surface reaction torque RCT when the vehicle is traveling at such a low (slow) speed and the driver steers the steering wheel 1. A slope of the road surface reaction torque with respect to a steering angle change is small, and thus even when the driver steers the steering wheel 1, a steering reaction torque SCT is not transmitted. In a steering control device, which is configured to generate the steering assist torque of the motor 6 so that the steering torque detected by the torque sensor 5 follows the target steering torque TST indicated by the solid line in FIG. 4 set by the target steering torque setting unit 22, the target steering torque is set as shown in FIG. 4 to generate a steering reaction torque with the steering assist torque, to thereby be able to provide a hand feeling to the driver when steering the steering wheel and to improve the feeling of reaction.

However, in a steering control device as described in Patent Literature 1, which is configured to calculate a steering assist torque based on the sum of a steering assist torque proportional control component, which is obtained by multiplying, by a proportional control gain, a deviation between a target steering torque set by target steering torque setting means and a steering torque detected by steering torque detection means, a steering assist torque integral control component, which is obtained by integrating the deviation and multiplying the integrated deviation by an integral control gain, and a steering assist torque derivative control component, which is obtained by differentiating the deviation and multiplying the differentiated deviation by a derivative control gain, there is the following fear. Specifically, although the steering torque of the driver follows the target steering torque due to the steering assist torque integral control component when the driver holds the steering wheel, to thereby be able to provide an appropriate feeling of reaction to the driver, the steering torque follows the target steering torque due to the steering assist torque integral control component also when the driver releases his or her hands, to thereby possibly cause the steering wheel to excessively return to the neutral position and produce an excessive return speed.

Figure 13:
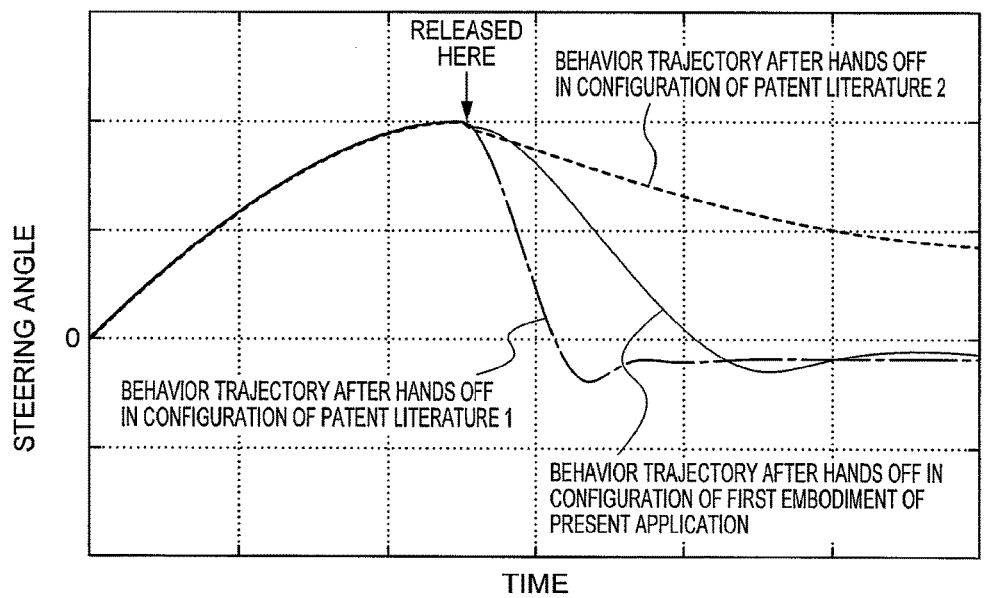
FIG. 13 is a graph for showing a behavior of the steering angle when a driver operating the steering control device according to the first embodiment of the present invention releases his or her hands from the steering wheel.

FIG. 5 is a graph for showing a relationship between the steering angle and the steering torque when the driver operating the steering control device according to the first embodiment of the present invention releases his or her hands from the steering wheel. "A" indicates a trajectory of a behavior according to the present application, "B" indicates a trajectory of Patent Literature 1, and "C" indicates a trajectory of Patent Literature 2. Further, FIG. 13 is a graph for showing behaviors of the steering angle of the present invention and the related art.

Specifically, as shown in FIG. 5, when the driver releases his or her hands from the steering wheel at a hands-off point HP, the driver does not hold the steering wheel, and thus it is necessary to generate a steering torque detected by the torque sensor 5 with an inertia moment acting on the steering wheel by accelerating the motor 6 toward the neutral position in order to cause the steering torque detected by the torque sensor 5 to follow the target steering torque TST, leading to an excessive steering assist torque in the direction of returning the steering wheel to the neutral position. As a result, as indicated by the thick solid line in FIG. 13, the steering wheel 1 excessively returns to the neutral position and an excessive return speed is produced. In this kind of hands-off state, the value of a differential control component calculated by differentiating the deviation is small, and thus this component does not have an effect of improving the excessive return speed. Further, there is also a problem in that differentiation of the deviation is likely to cause a noise or control stability is difficult to secure when the positions of the motor 6 and the torque sensor 5 are away from each other.

Further, as disclosed in Patent Literature 2, when the steering assist torque is calculated based on the sum of the steering assist torque proportional control component, which is obtained by multiplying, by a proportional control gain, a deviation between a target steering torque set by target steering torque setting means and a steering torque detected by steering torque detection means, the steering assist torque derivative control component, which is obtained by differentiating the deviation and multiplying the differentiated deviation by a derivative control gain, and a motor velocity control component, which is obtained by multiplying the motor rotational angular velocity by a velocity control gain, the steering assist torque integral control component is not included in the calculation. Therefore, even when the driver holds the steering wheel, the steering torque does not follow the target steering torque, with the result that the driver cannot obtain an appropriate feeling of reaction. Further, when the driver releases his or her hands, the integral control component is not included in the calculation, and thus the steering assist torque is small and the steering torque is almost zero as indicated by "C" in FIG. 5. As a result, as indicated by the broken line in FIG. 13, the return torque caused by the steering assist torque is small, and thus there is a fear in that the steering wheel may not return to the neutral position, or the return speed may become too low.

In the steering control device according to the first embodiment, the steering assist torque integral control component (first steering assist torque) is included in the calculation, and thus when the driver holds the steering wheel 1, the steering torque of the driver follows the target steering torque and the driver can obtain an appropriate feeling of reaction. When the driver release his or her hands, the motor velocity control component (second steering assist torque), which is obtained by multiplying the motor rotational angular velocity by a velocity control gain, allows the steering torque to be adjusted between zero and the target steering torque as indicated by "A" in FIG. 5, with the result that the return speed of the steering wheel 1 can be suppressed as indicated by the thin solid line in FIG. 13. That is, it is possible to cause the steering torque to maintain a moderate following error and follow the target steering torque. As a result, when the driver holds the steering wheel for steering, the steering torque follows the target steering torque so as to achieve smooth steering, whereas when the driver releases his or her hands, the steering wheel can be returned to the neutral position at an appropriate speed, to thereby be able to achieve satisfactory steering feelings at even in a steering state and in a hands-off state. Further, it is possible to secure control stability through use of the motor velocity control component (second steering assist torque) even when the positions of the motor 6 and the torque sensor 5 are away from each other. In addition, the target steering torque is not required to be differentiated, and thus it is possible to suppress the noise and achieve smooth and stable steering.

The first steering assist torque calculation unit 24 also includes the subtractor 23.

Second Embodiment

Figure 6:
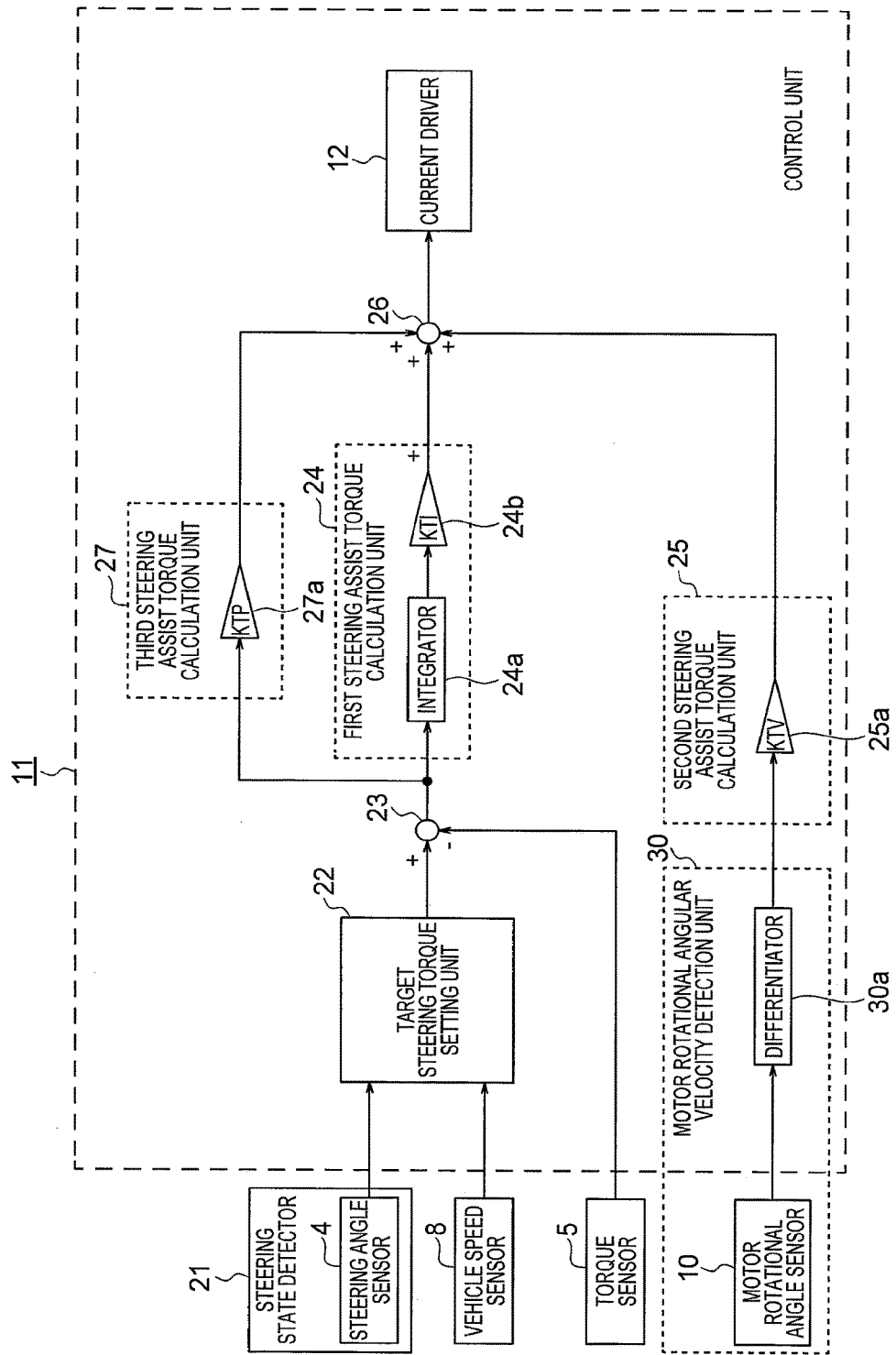
FIG. 6 is a block diagram for illustrating a main unit of a steering control device according to a second embodiment of the present invention.
Figure 7:
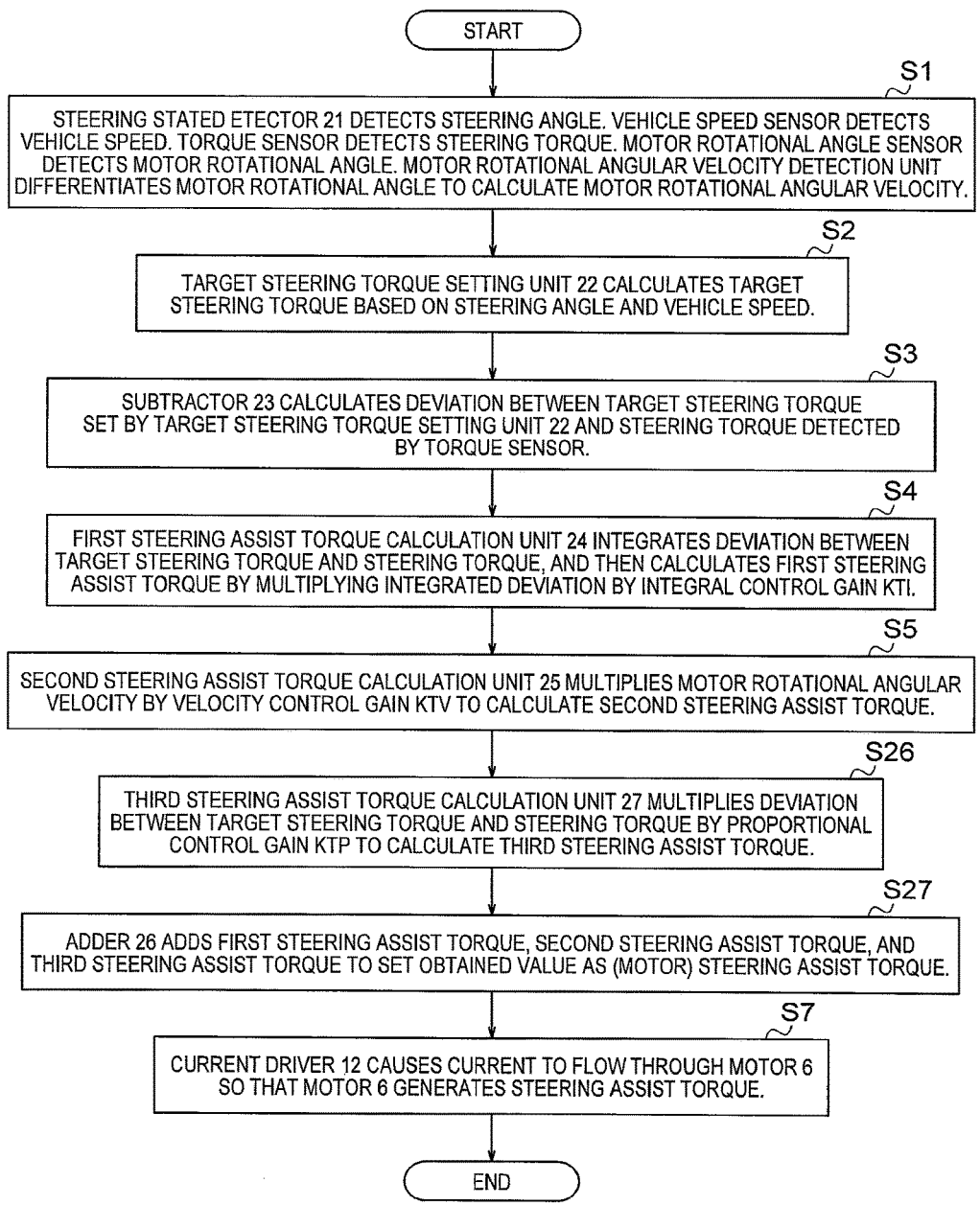
FIG. 7 is a flowchart for illustrating an operation of the main unit of the steering control device according to the second embodiment of the present invention.

Next, regarding a second embodiment of the present invention, a description is given of calculation of the steering assist torque in the control unit 11, which is a main unit of the present invention, with reference to a block diagram of FIG. 6 for illustrating a configuration of the main unit and a flowchart of FIG. 7 for illustrating an operation of the main unit.

The difference between the second embodiment and the first embodiment is that a third steering assist torque calculation unit 27 illustrated in FIG. 6 is added in the second embodiment. In the flowchart of FIG. 7, in Step S26, the steering assist torque calculation unit 27 calculates a third steering assist torque by multiplying a deviation between the target steering torque and the steering torque by a proportional control gain KTP with a multiplier 27a. In Step S27, the adder 26 adds the first steering assist torque, the second steering assist torque, and the third steering assist torque, to set the obtained value as a motor steering assist torque.

With this configuration, in addition to obtaining the effect shown in the first embodiment, the responsiveness of the steering assist torque proportional control component (third steering assist torque) is higher than that of the steering assist torque integral control component (first steering assist torque), and thus it is possible to achieve higher following responsiveness and reduce an overshoot. As a result, it is possible to cause the steering torque to stably follow the target steering torque and achieve smoother steering when the driver holds the steering wheel 1 for steering.

Figure 14:
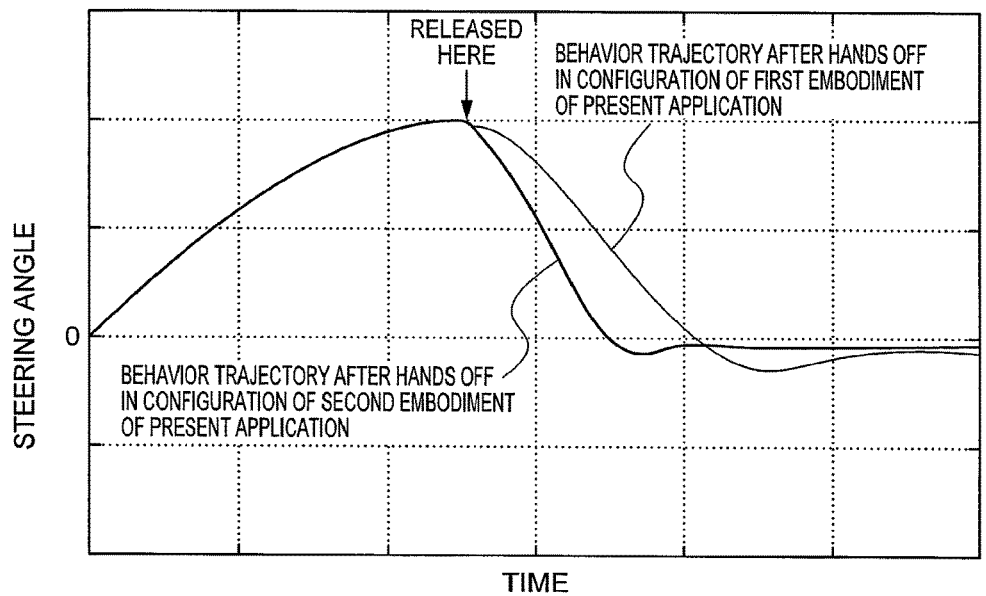
FIG. 14 is a graph for showing a behavior of the steering angle when the driver operating the steering control device according to the second embodiment of the present invention releases his or her hands from the steering wheel.

FIG. 14 is a graph for showing a behavior of a steering angle when the driver releases his or her hands from the steering wheel according to the first and second embodiments. The following responsiveness of causing the steering torque to follow the target steering torque in the second embodiment indicated by the thick solid line in FIG. 14 is higher than that in the first embodiment indicated by the thin solid line in FIG. 14. Thus, it is possible to achieve higher returning responsiveness and reduce an overshoot amount after the steering wheel returns to the neutral position.

The third steering assist torque calculation unit 27 shares the subtractor 23 with the first steering assist torque calculation unit 24.

Third Embodiment

Figure 8:
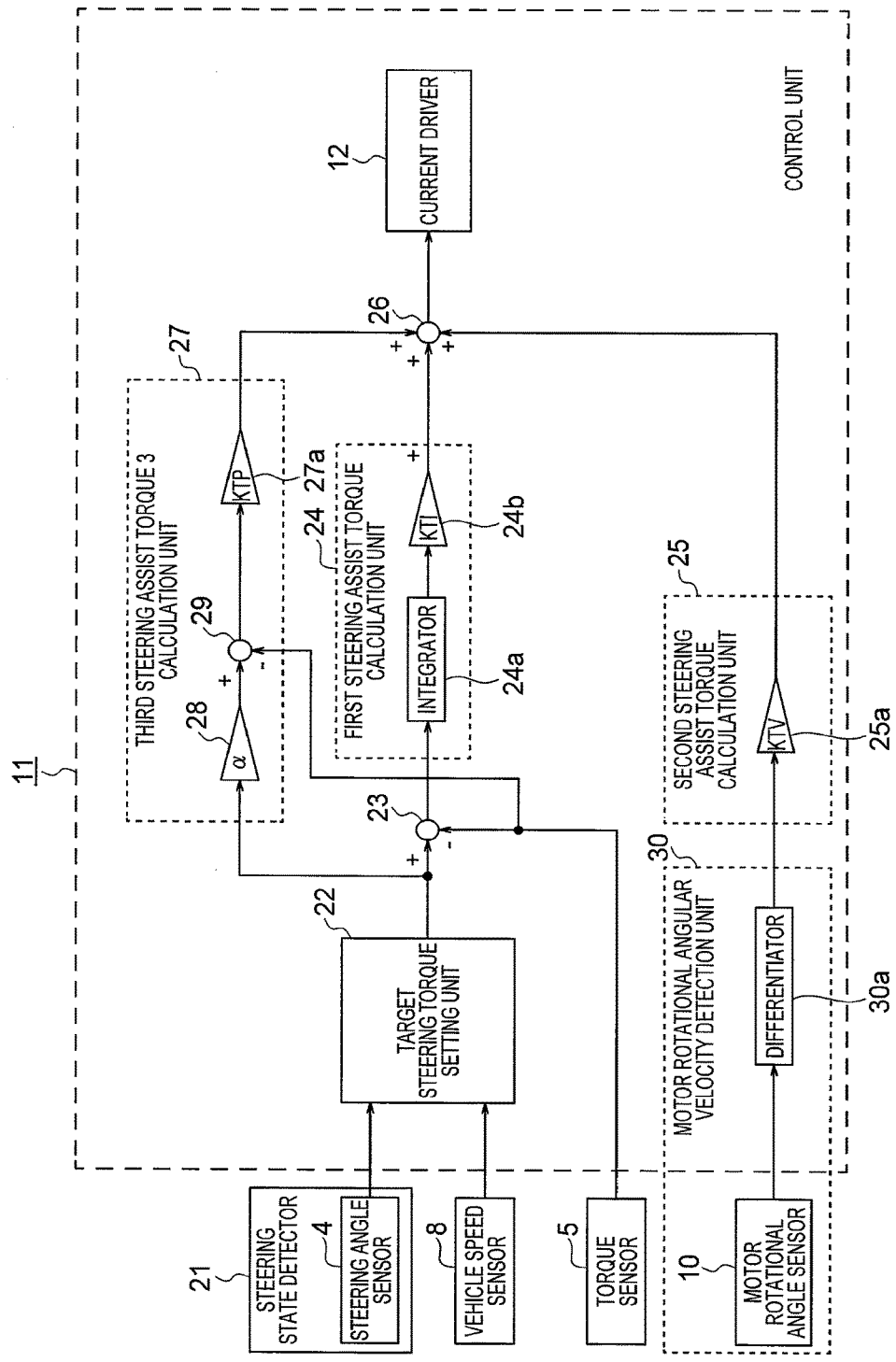
FIG. 8 is a block diagram for illustrating a main unit of a steering control device according to a third embodiment of the present invention.
Figure 9:
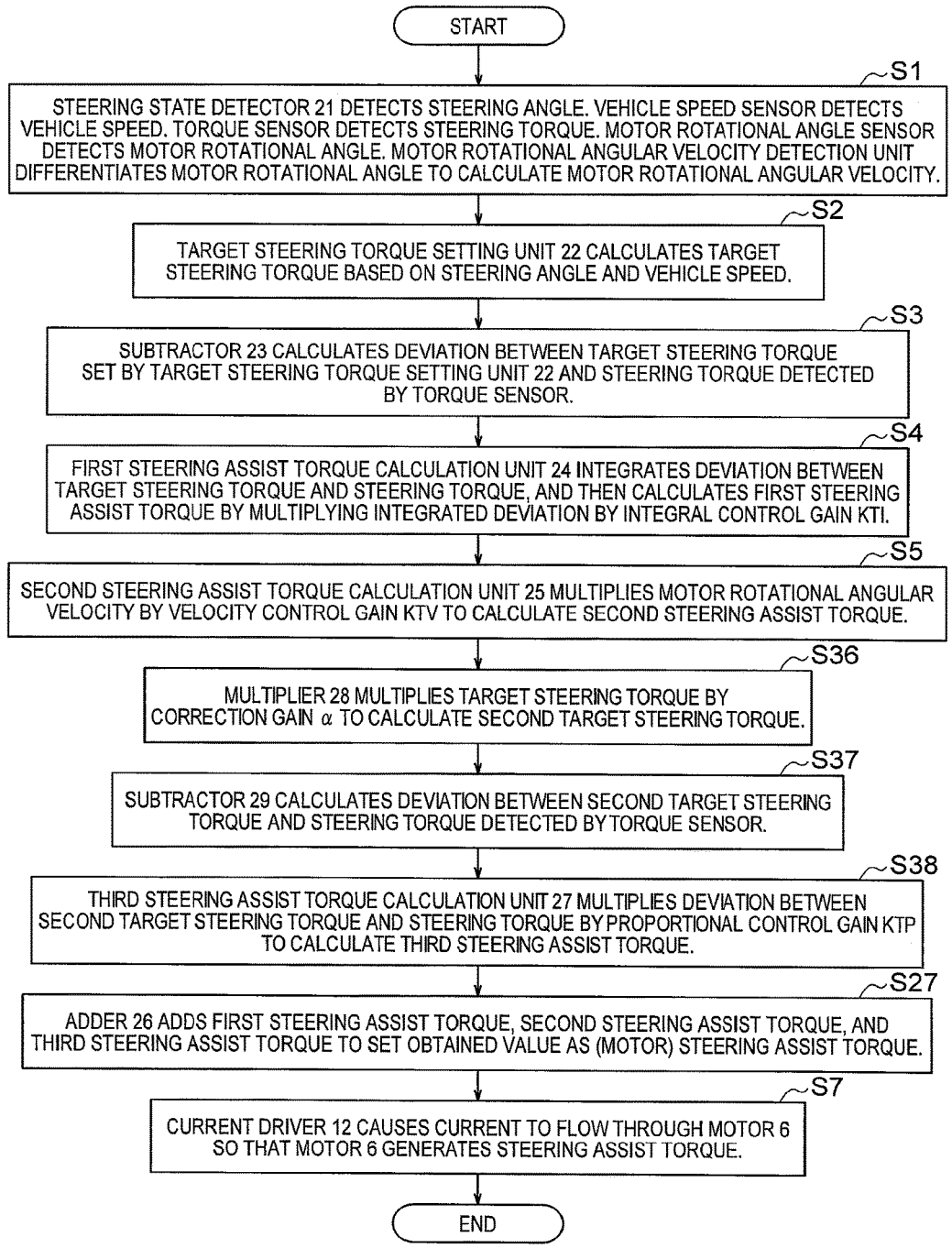
FIG. 9 is a flowchart for illustrating an operation of the main unit of the steering control device according to the third embodiment of the present invention.

Next, regarding a third embodiment of the present invention, a description is given of calculation of the steering assist torque in the control unit 11, which is a main unit of the present invention, with reference to a block diagram of FIG. 8 for illustrating a configuration of the main unit and a flowchart of FIG. 9 for illustrating an operation of the main unit.

The difference between the second embodiment and the third embodiment is that the processing of calculating the steering torque deviation to be used in the third steering assist torque calculation unit 27 illustrated in FIG. 8 is different. In the flowchart of FIG. 9, in Step S36, a multiplier 28 multiplies the first target steering torque by a correction gain α to calculate a second target steering torque. α is a value equal to or more than 0 and less than 1, and thus the second target steering torque is a value having a magnitude less than that of the target steering torque.

Then, in Step S37, a subtractor 29 calculates a deviation between the second target steering torque and the steering torque detected by the torque sensor 5. In Step S38, a multiplier 27a multiplies the deviation between the second target steering torque and the steering torque by the proportional control gain KTP to calculate a third steering assist torque. Further, in Step S27, the adder 26 adds the first steering assist torque, the second steering assist torque, and the third steering assist torque, to set the obtained value as a motor steering assist torque.

With this configuration, in addition to obtaining the effect shown in the first embodiment, it is possible to achieve higher following responsiveness of causing the steering torque to follow the target steering torque compared to the configuration described in the first embodiment, and to reduce an overshoot further compared to the configuration described in the second embodiment.

Figure 15:
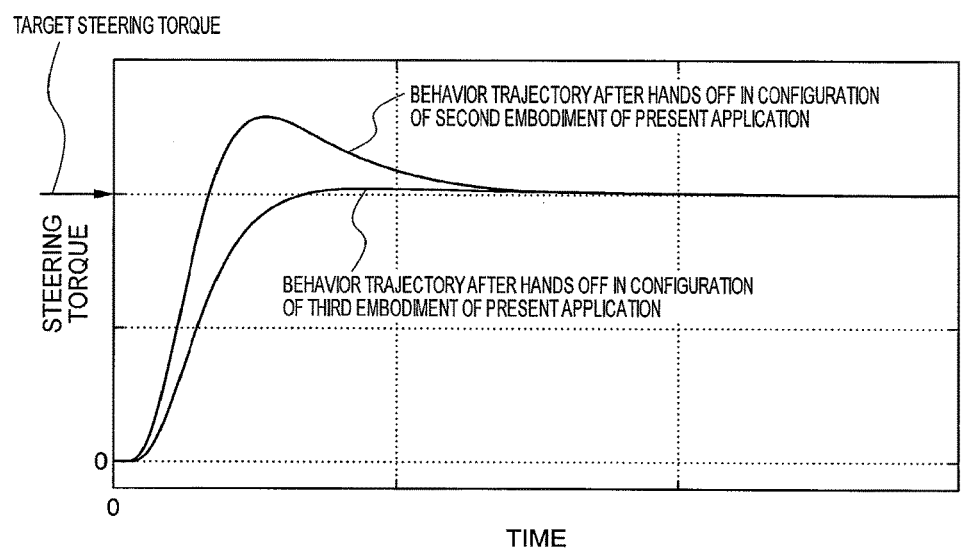
FIG. 15 is a graph for showing responsiveness of the steering torque of the steering control device according to the third embodiment of the present invention.

FIG. 15 is a graph for showing responsiveness of the steering torque in the second and third embodiments when the target steering torque is changed in a stepwise manner. The overshoot can be reduced in the case of the third embodiment on a lower side compared to the case of the second embodiment on an upper side. It can also be confirmed that the steering torque follows the target steering torque in both the configurations of the second and third embodiments. As a result, when the driver holds the steering wheel for steering, the steering torque stably follows the target steering torque, to thereby be able to achieve smoother steering. Further, even when α is changed, the performance of suppressing a road disturbance torque input from the steered wheels 3 is not changed, and thus it is possible to adjust the overshoot while maintaining the performance of suppressing the road disturbance torque in the same degree as in the second embodiment. As a result, it is possible to appropriately adjust a property of the steering torque to follow the target steering torque when the driver steers the steering wheel, and further to reduce a steering torque variation due to the road disturbance torque caused by the steered wheels 3 being disturbed by a wheel track, to thereby be able to achieve smoother steering.

Further, when the steering torque control device is applied to a steering system including a mechanism in which a relationship between the steering angle of the steering wheel 1 and the steered angle of the steered wheels 3 can be arbitrary changed, there is a fear in that the road surface reaction torque, which is changed by the steering system changing the steered angle of the steered wheels, may be transmitted to the driver as a disturbance torque, but the configuration of this embodiment enables reduction of a steering torque variation due to the disturbance torque, to thereby be able to achieve smoother steering.

Fourth Embodiment

Figure 10:
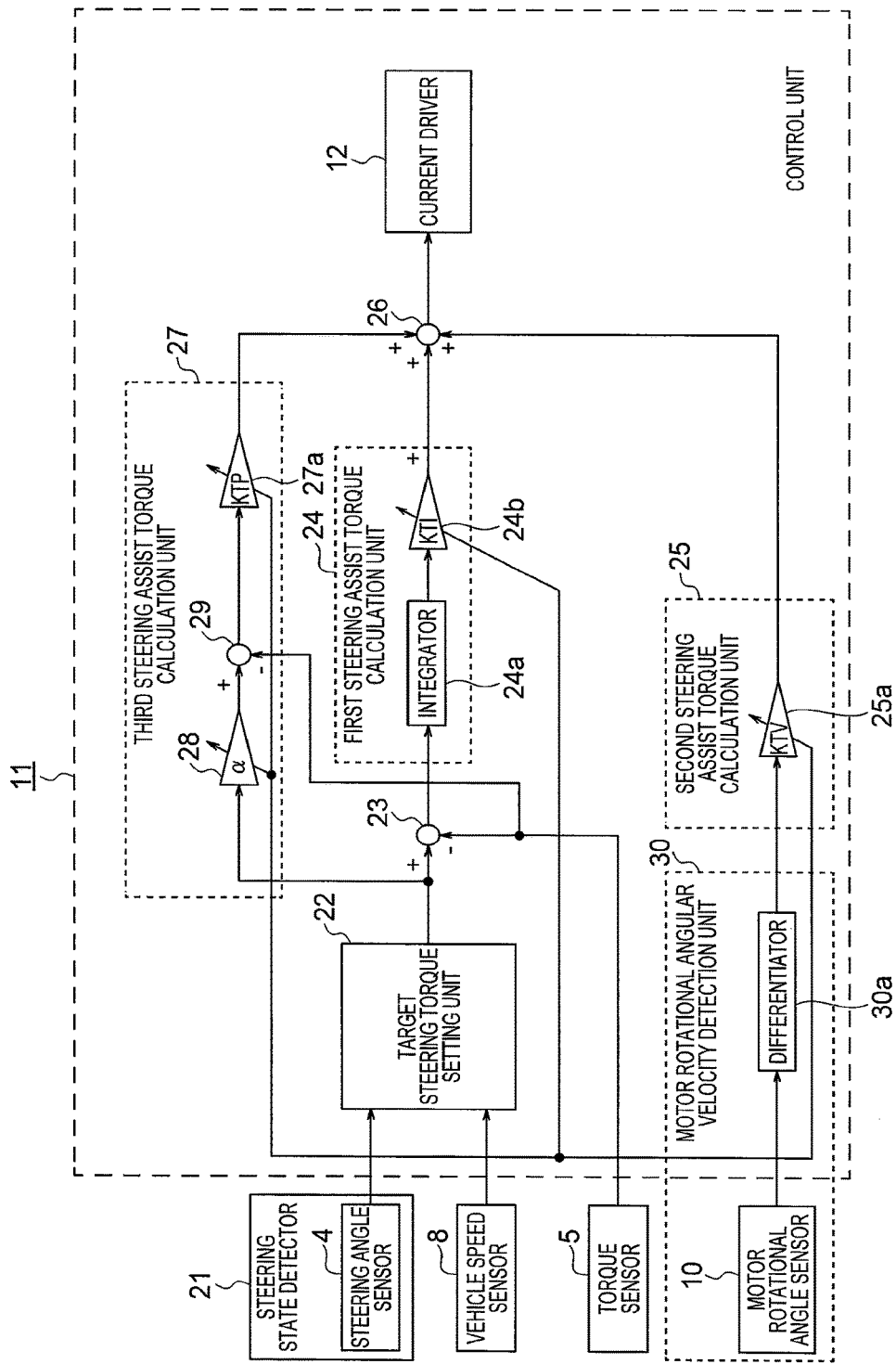
FIG. 10 is a block diagram for illustrating a main unit of a steering control device according to a fourth embodiment of the present invention.

Next, a description is given of calculation of the steering assist torque in the control unit 11, which is a main unit of the present invention, with reference to a block diagram of FIG. 10 for illustrating a configuration of the main unit.

In this embodiment, the integral control gain KTI, the velocity control gain KTV, the proportional control gain KTP, and the correction gain α are set variable with respect to the vehicle speed.

With this configuration, it is possible to set an appropriate control gain depending on a characteristic of the road surface reaction torque that changes depending on the vehicle speed, and to cause the steering torque to follow the target steering torque stably and with high responsiveness depending on the vehicle speed, to thereby be able to achieve smoother steering. Further, when the driver releases his or her hands from the steering wheel, it is possible to return the steering wheel to the neutral position at an appropriate speed, to thereby be able to achieve satisfactory steering feelings at even in a steering state and in a hands-off state.

For example, the road surface reaction torque is small at a low vehicle speed, and thus the steering wheel is less likely to return to the neutral position, whereas the road surface reaction torque is large at a high vehicle speed, and thus the steering wheel returns to the neutral position at an excessively high return speed. Thus, an absolute value of the integral control gain KTI is set smaller at a high vehicle speed than at a low vehicle speed. In other cases, an absolute value of the velocity control gain KTV is set larger at a high vehicle speed than at a low vehicle speed. Setting the absolute value of the gain smaller means setting an influence of the control component smaller. As a result, as indicated by "integral control gain KTI→large" and "integral control gain KTI→small" of the broken lines with respect to a behavior trajectory A in the case of this embodiment shown in FIG. 16 corresponding to FIG. 5, it is possible to adjust the return speed, that is, increase the speed of returning to the neutral position when the driver releases his or her hands from the steering wheel at a low vehicle speed, or suppress the speed of returning to the neutral position at a high vehicle speed.

Further, when the integral control gain KTI or the speed control gain KTV is changed depending on the vehicle speed, it is possible to appropriately adjust the following responsiveness and the overshoot amount by changing the proportional control gain KTP and the correction gain α depending on the vehicle speed as well.

All the gains do not need to be set variable with respect to the vehicle speed, and one or more of the gains may be set variable with respect to the vehicle speed.

Fifth Embodiment

Figure 11:
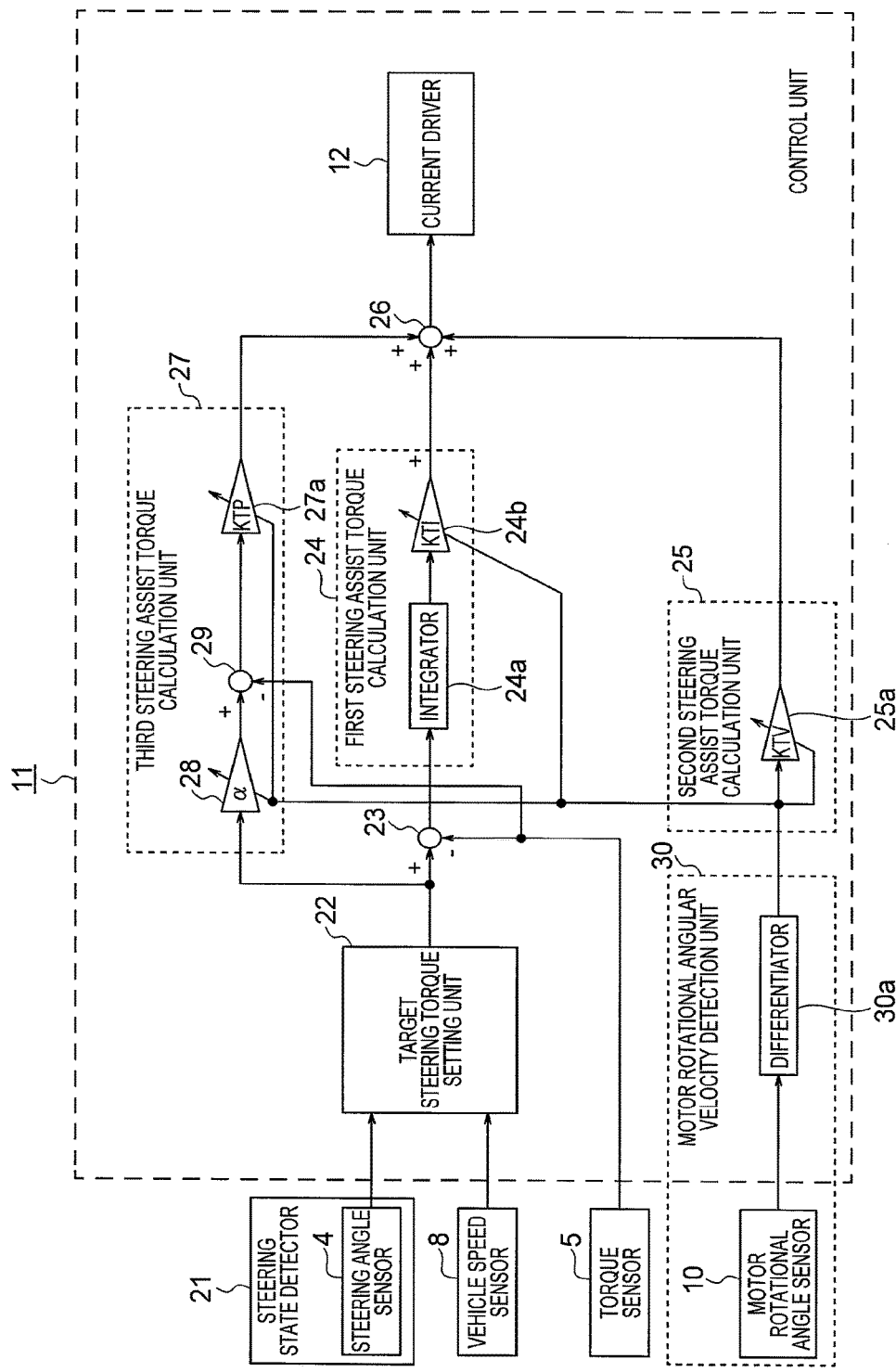
FIG. 11 is a block diagram for illustrating a main unit of a steering control device according to a fifth embodiment of the present invention.

Next, regarding a fifth embodiment of the present invention, a description is given of calculation of the steering assist torque in the control unit 11, which is a main unit of the present invention, with reference to a block diagram of FIG. 11 for illustrating a configuration of the main unit.

In this embodiment, the integral control gain KTI, the velocity control gain KTV, the proportional control gain KTP, and the correction gain α are set variable with respect to the motor rotational angular velocity. As illustrated in FIG. 11, in this embodiment, the motor rotational angle detected by the motor rotational angle sensor 10 is differentiated to be used as the motor rotational angular velocity, but the motor rotational angular velocity may be calculated from the steering angular velocity obtained by differentiating the steering angle detected by the steering angle sensor 4.

With this configuration, it is possible to obtain a steering control device capable of: setting an appropriate control gain depending on the motor rotational angular velocity or the steering angular velocity; causing the steering torque to follow the target steering torque stably and with high responsiveness depending on the motor rotational angular velocity or the steering angular velocity, to thereby be able to achieve smoother steering; and making an adjustment so that the steering wheel returns to the neutral position at an appropriate speed when the driver releases his or her hands from the steering wheel, to thereby be able to achieve satisfactory steering feelings at even in a steering state and in a hands-off state.

Figure 16:
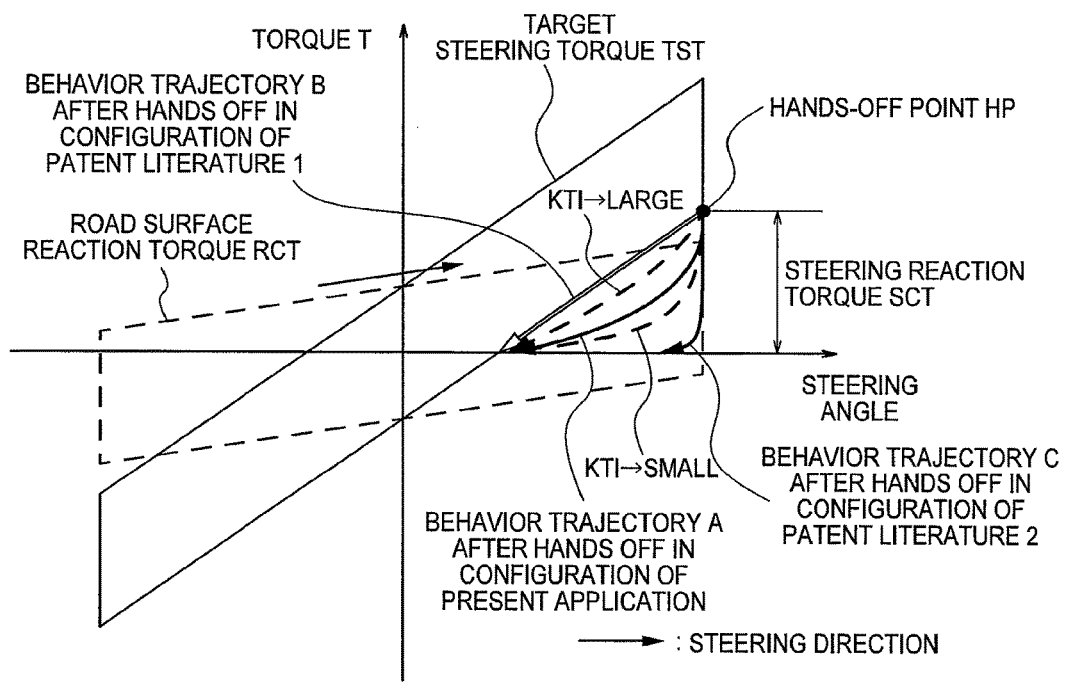
FIG. 16 is a graph for showing a relationship between the steering angle and the steering torque when the driver operating the steering control device according to each of the fourth to sixth embodiments of the present invention releases his or her hands from the steering wheel.

For example, as described above, the return speed can be adjusted as shown in FIG. 16, and when the speed of returning to the neutral position is excessive, that is, when the motor rotational angular velocity is excessive, the absolute value of the integral control gain KTI is set smaller at a high motor rotational angular velocity than at a low motor rotational angular velocity. In other cases, the absolute value of the speed control gain KTV is set larger at a high motor rotational angular velocity than at a low motor rotational angular velocity. As a result, when the speed of returning to the neutral position is excessive, it is possible to suppress the return speed.

Further, when the integral control gain KTI or the speed control gain KTV is changed depending on the motor rotational angular velocity, it is possible to appropriately adjust the following responsiveness and the overshoot amount by changing the proportional control gain KTP and the correction gain α depending on the motor rotational angular velocity as well.

All the gains do not need to be set variable depending on the motor rotational angular velocity, and one or more of the gains may be set variable depending on the motor rotational angular velocity.

Sixth Embodiment

Figure 12:
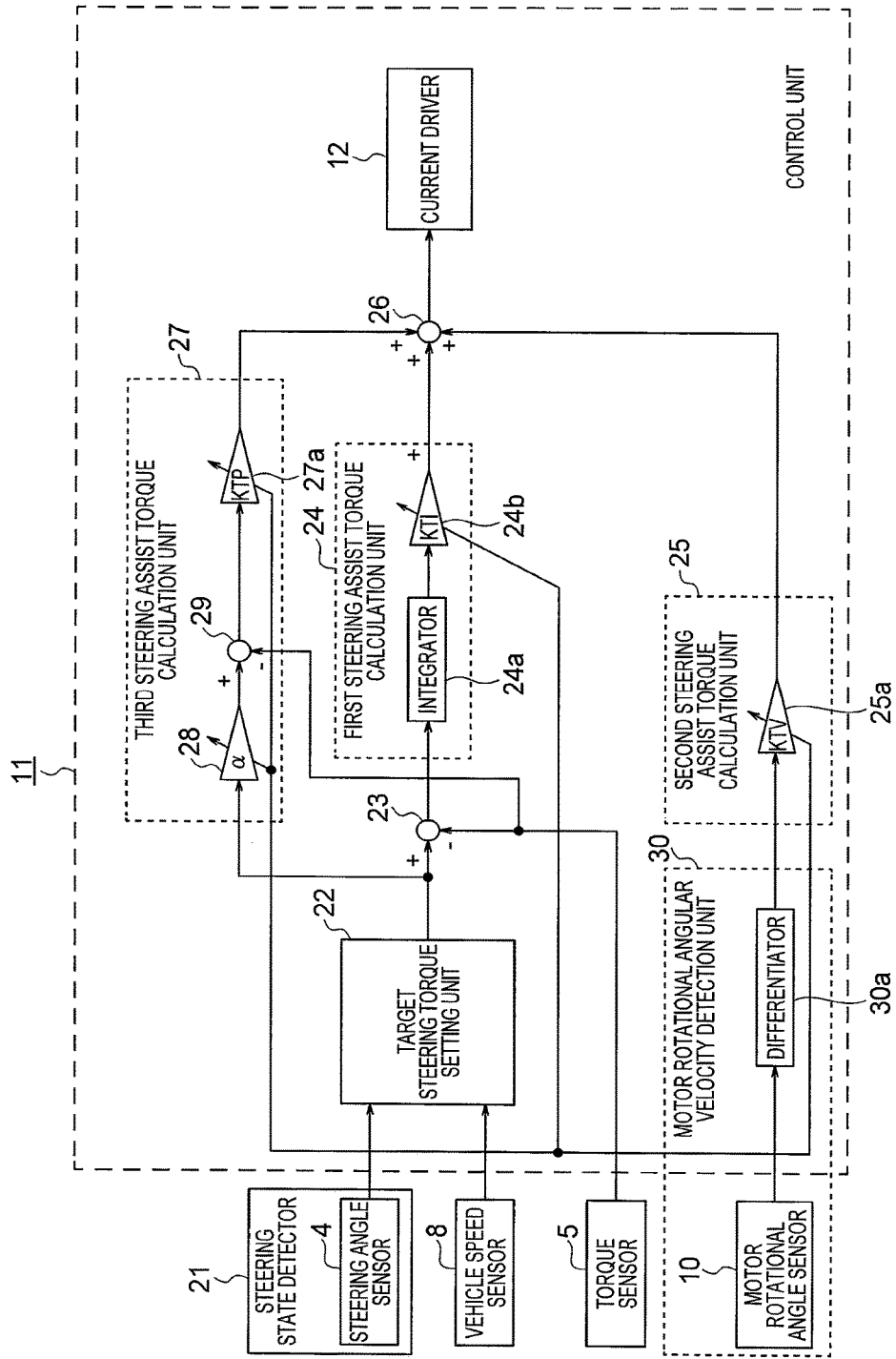
FIG. 12 is a block diagram for illustrating a main unit of a steering control device according to a sixth embodiment of the present invention.

Next, regarding a sixth embodiment of the present invention, a description is given of calculation of the steering assist torque in the control unit 11, which is a main unit of the present invention, with reference to a block diagram of FIG. 12 for illustrating a configuration of the main unit.

In this embodiment, the integral control gain KTI, the velocity control gain KTV, the proportional control gain KTP, and the correction gain α are set variable with respect to the steering torque.

With this configuration, it is possible to obtain a steering control device capable of: setting an appropriate gain depending on the steering torque; causing the steering torque to follow the target steering torque stably and with high responsiveness depending on the steering torque, to thereby be able to achieve smoother steering; and returning the steering wheel to the neutral position at an appropriate speed when the driver releases his or her hands from the steering wheel, to thereby be able to achieve satisfactory steering feelings even in a steering state and in a hands-off state.

For example, as described above, the return speed can be adjusted as shown in FIG. 16, and when the steering torque is large, it can be determined that the driver is steering the steering wheel. Thus, the absolute value of the integral control gain KTI is set larger at a high steering torque than at a low steering torque. In other cases, the absolute value of the speed control gain KTV is set larger at a low steering torque than at a high steering torque. As a result, when it can be determined that the driver is steering the steering wheel, it is possible to secure the property of the steering torque to follow the target steering torque, and to suppress the return speed when the speed of returning to the neutral position is excessive.

Further, it is possible to appropriately adjust the following responsiveness and the overshoot amount by changing the proportional control gain KTP and the correction gain α depending on the steering torque. For example, the correction gain α is set small to suppress the overshoot in the vicinity of the neutral position, that is, in a region where the steering torque is small to suppress the overshoot, whereas the correction gain α is set large at a region where the steering torque is large to improve the property of the steering torque to follow the target torque.

All the gains do not need to be set variable depending on the steering torque, and one or more of the gains may be set variable depending on the steering torque.

Further, in this embodiment, it is determined whether or not the driver is steering the steering wheel based on the magnitude of the steering torque, but a configuration may be employed in which the steering torque, the steering angular velocity, the steering angle, and the like are used in a composite manner to determine the steering state of the driver and change each gain depending on the steering state. As a result, when it can be determined that the driver is steering the steering wheel, it is possible to: secure the property of the steering torque to follow the target steering torque; suppress the return speed when the speed of returning to the neutral position is excessive; and increase the return speed when the speed of returning to the neutral position is too low.

Each embodiment is described to employ a configuration in which the target steering torque is set based on the steering angle and the vehicle speed, but is not limited to this configuration. The torque sensor 5, a yaw rate sensor of the vehicle, a lateral acceleration sensor, and the road surface reaction torque may be used other than the steering angle sensor 4 as the steering state detector 21 configured to detect the state amount relating to the lateral motion of the vehicle Seventh Embodiment Next, regarding a seventh embodiment of the present invention, a description is given of calculation of the steering assist torque in the control unit 11, which is a main unit of the present invention, with reference to a block diagram of FIG. 17 for illustrating a configuration of the main unit and a flowchart of FIG. 18 for illustrating an operation of the main unit.

Figure 17:
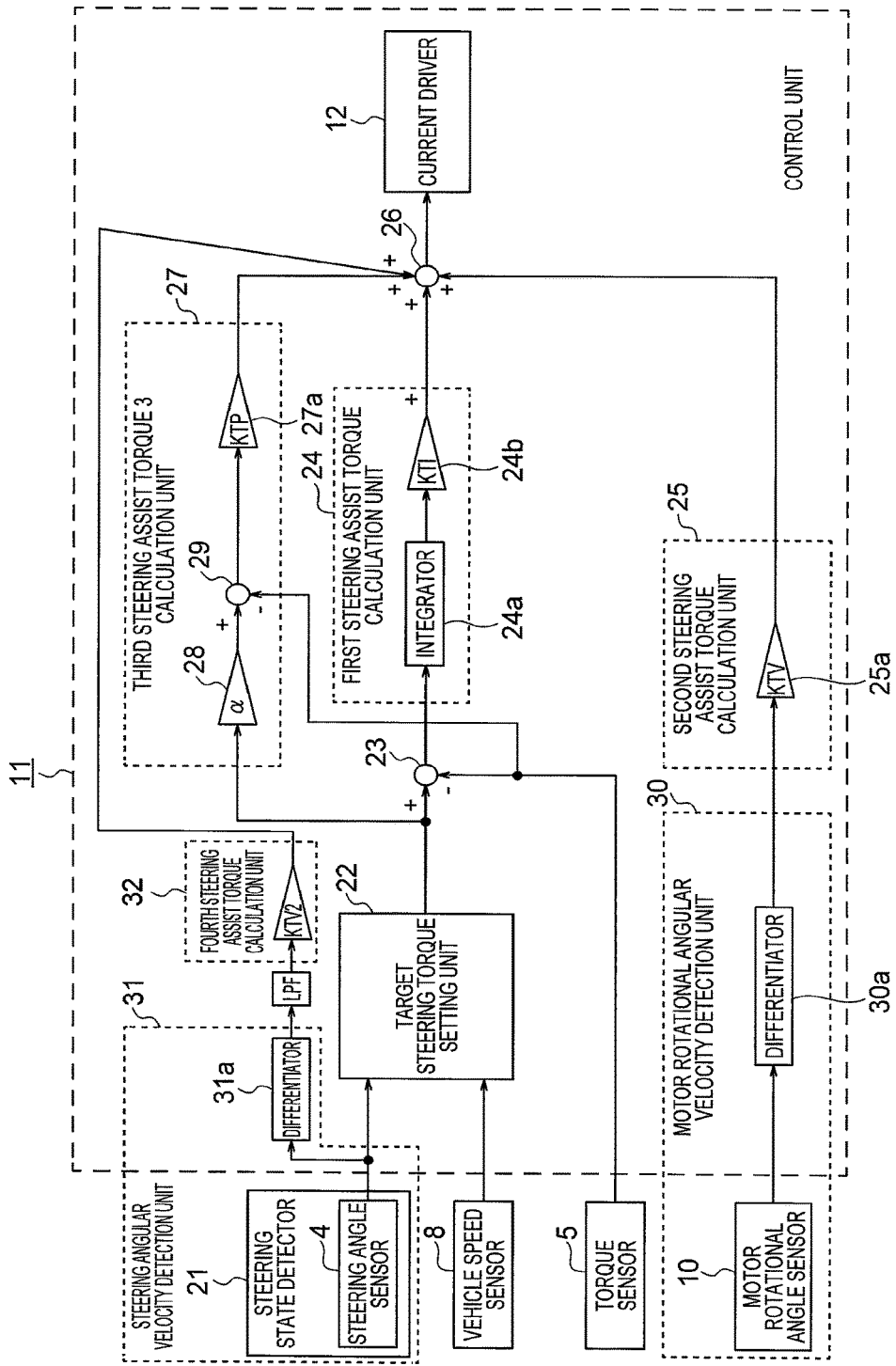
FIG. 17 is a block diagram for illustrating a main unit of a steering control device according to a seventh embodiment of the present invention.
Figure 18:
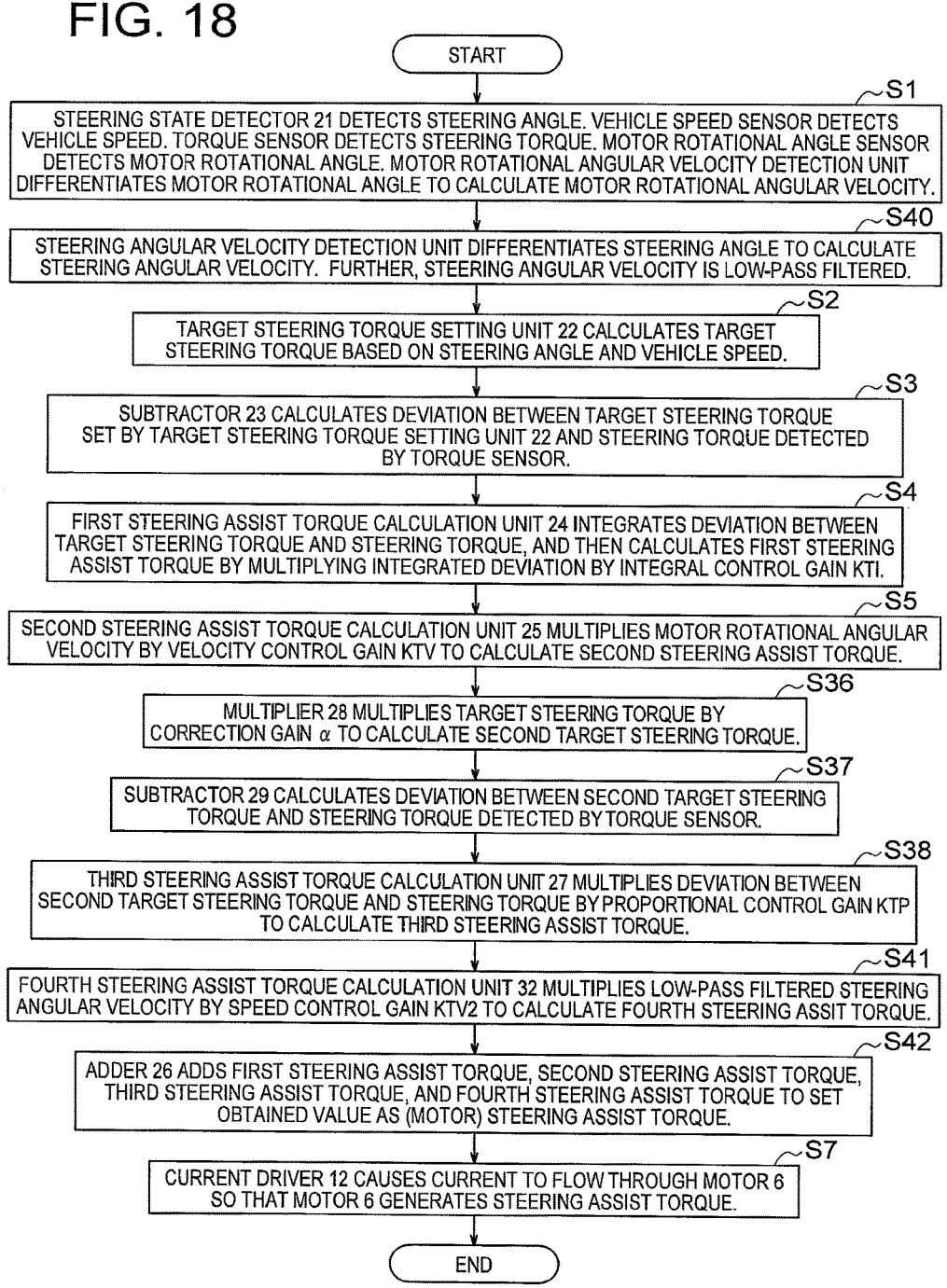
FIG. 18 is a flowchart for illustrating an operation of the main unit of the steering control device according to the seventh embodiment of the present invention.

The difference between the seventh embodiment and the second and third embodiments is that a fourth steering assist torque calculation unit 32 illustrated in FIG. 17 is added in the seventh embodiment. In the flowchart of FIG. 18, in Step S40, a steering angular velocity detection unit 31 differentiates the steering angle detected by the steering angle sensor 4 with a differentiator 31a to calculate the steering angular velocity. Further, the steering angular velocity is low-pass filtered with a low-pass filter LPF. In this case, the cut-off frequency of the low-pass filter is set to a value that enables a set frequency component including the steering frequency of the driver to be extracted. In general, the limit steering frequency of the driver is 5 Hz or less, and the resonance frequency of the steering shaft is about ten and several Hz, and thus the cut-off frequency is set to a value larger than 0 and equal to or less than 10 Hz. In Step S41, the fourth steering assist torque calculation unit 32 multiplies the low-pass filtered steering angular velocity by a speed control gain KTV2 to calculate a fourth steering assist torque. The sign of the speed control gain KTV2 is opposite to that of the speed control gain KTV. In Step S42, the adder 26 adds the first steering assist torque, the second steering assist torque, the third steering assist torque, and the fourth steering assist torque to set the obtained value as the motor steering assist torque.

With this configuration, in addition to obtaining the effects shown in the second and third embodiments, even when the driver performs a high-frequency steering operation, for example, a steering operation for a sudden lane change, it is possible to improve the property of the steering torque to follow the target steering torque and achieve smoother steering.

That is, when the driver steers the steering wheel 1 at a high frequency, the distortion of the torque sensor 5 due to this high-frequency steering operation becomes larger to disturb the steering control device, and thus the property of the steering torque to follow the target steering torque deteriorates and the driver feels resistance at the time of steering operation. With this configuration described in this embodiment, it is possible to reduce the influence of the disturbance that is caused by a high-frequency steering operation of the driver, to thereby be able to improve the property of the steering torque to follow the target steering torque and achieve smoother steering.

Further, the steering angular velocity contains the steering frequency component of the driver, and through low-pass filtering processing for reducing the resonance frequency component of the steering shaft, the influence of the noise caused by differentiation can be eliminated and the steering shaft is prevented from being excited at the resonance frequency. Therefore, it is possible to achieve smooth steering without degrading the stability of the control system.

The steering state detection unit 21 and the differentiator 31a form the steering angular velocity detection unit 31.

Eighth Embodiment

Figure 19:
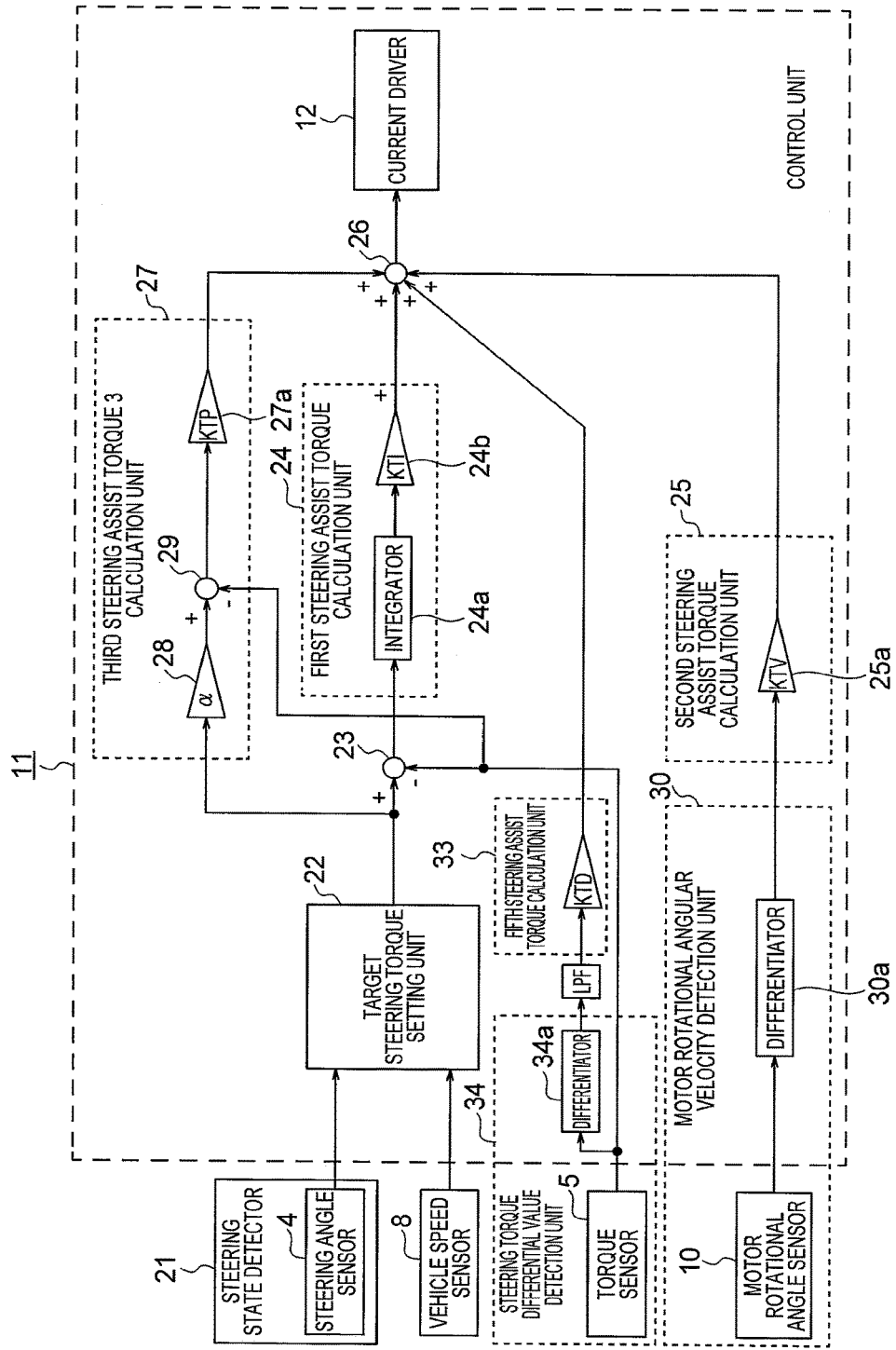
FIG. 19 is a block diagram for illustrating a main unit of a steering control device according to an eighth embodiment of the present invention.
Figure 20:
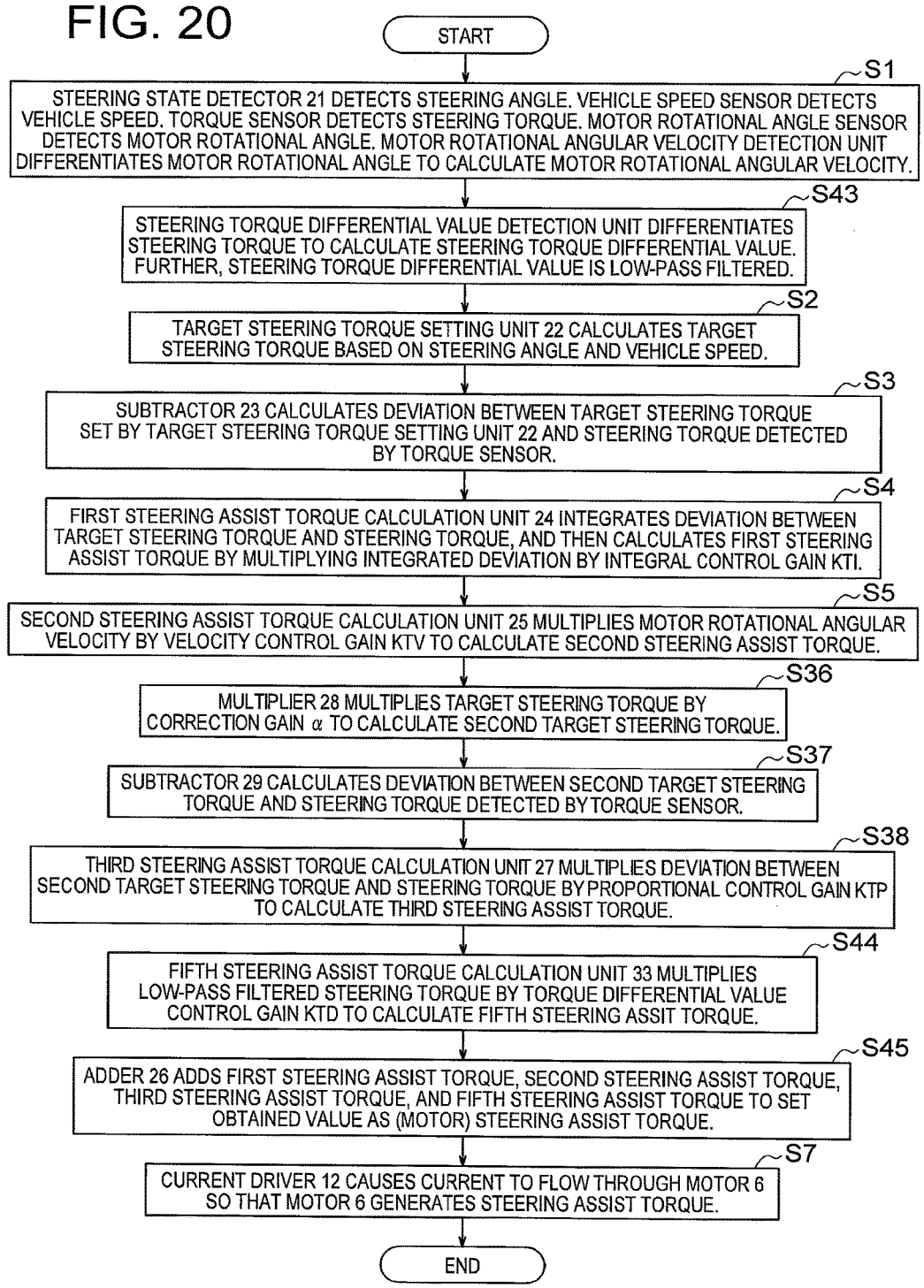
FIG. 20 is a flowchart for illustrating an operation of the main unit of the steering control device according to the eighth embodiment of the present invention.

Next, regarding an eighth embodiment of the present invention, a description is given of calculation of the steering assist torque in the control unit 11, which is a main unit of the present invention, with reference to a block diagram of FIG. 19 for illustrating a configuration of the main unit and a flowchart of FIG. 20 for illustrating an operation of the main unit.

The difference between the seventh embodiment and the eighth embodiment is that a fifth steering assist torque calculation unit 33 illustrated in FIG. 19 uses the steering torque differential value instead of that of the steering angular velocity. In the flowchart of FIG. 20, in Step S43, a steering torque differential value detection unit 34 differentiates the steering torque detected by the torque sensor 5 with a differentiator 34a to calculate a steering torque differential value. Further, the steering torque differential value is low-pass filtered with the low-pass filter LPF. In this case, the cut-off frequency of the low-pass filter is set to a value that enables a set frequency component including the steering frequency of the driver to be extracted. In general, the limit steering frequency of the driver is 5 Hz or less, and the resonance frequency of the steering shaft is about ten and several Hz, and thus the cut-off frequency is set to a value larger than 0 and equal to or less than 10 Hz. In Step S44, the fifth steering assist torque calculation unit 33 multiplies the low-pass filtered steering torque differential value by a torque differential value gain KTD to calculate a fifth steering assist torque. In Step S45, the adder 26 adds the first steering assist torque, the second steering assist torque, the third steering assist torque, and the fifth steering assist torque to set the obtained value as the motor steering assist torque.

With this configuration, similarly to the seventh embodiment, even when the driver performs a high-frequency steering operation, it is possible to improve the property of the steering torque to follow the target steering torque and achieve smoother steering. Further, the steering torque differential value contains the steering frequency component of the driver, and through low-pass filtering processing for reducing the resonance frequency component of the steering shaft, the influence of the noise caused by differentiation can be eliminated and the steering shaft is prevented from being excited at the resonance frequency. Therefore, it is possible to achieve smooth steering without degrading the stability of the control system.

Now, a description is given of obtaining the effect similar to that of the seventh embodiment with the configuration of the eighth embodiment. When dθh, dθm, dTs, Ks, and R denote the steering angular velocity, the motor rotational angular velocity, the steering torque differential value, a torque constant of the torque sensor 5, and a speed reduction ratio of the speed reducer 7, respectively, a relationship of Expression (1) is satisfied.

$$d\theta h = d\theta m/R + dTs/Ks \quad (1)$$

Expression (1) indicates that the steering angular velocity is estimated from the motor rotational angular velocity dθm and the steering torque differential value dTs. That is, the estimated value of the steering angular velocity calculated using Expression (1) is used instead of the steering angular velocity of the seventh embodiment, to be able to obtain the effect similar to that of the seventh embodiment. In particular, the first term on the right side of Expression (1) has an effect equal to that of the second steering assist torque, and thus it is possible to obtain the effect similar to that of the seventh embodiment by multiplying the steering torque differential value dTs by the correction gain KTD to calculate the fifth steering assist torque.

Further, when the first term on the right side of Expression (1) is left, the sum of the fifth steering assist torque component due to the first term on the right side of Expression (1) and the second steering assist torque is a steering assist torque proportional to a high-pass filter or a motor rotational angular velocity to which a first order lead filter is applied. That is, it is possible to obtain the effect similar to that of the seventh embodiment also when a high-pass filter or a motor rotational angular velocity to which a first order lead filter is applied is used as the motor rotational angular velocity to be used for calculation of the second steering assist torque.

The sign of the torque differential value gain KTD is opposite to that of the speed control gain KTV. Further, the following expression may be satisfied.

$$|KTD| <= |KTV \times R/Ks|$$

With this calculation, it is possible to achieve smooth steering without degrading the stability of the control system.

The torque sensor 5 and the differentiator 34a form the steering torque differential value detection unit 34.

Further, the present invention is not limited to each embodiment described above, but rather includes possible combinations of all the embodiments. Therefore, the present invention can obtain the effects shown in the embodiments.

INDUSTRIAL APPLICABILITY

The steering control device and the steering assist torque control method according to the present invention can be applied to steering control devices in various fields.

The invention claimed is:

1. A steering control device, comprising:
   a steering torque detector configured to detect a steering torque acting on a steering shaft;
   a target steering torque setter configured to set a target steering torque;
   a first steering assist torque calculator configured to calculate a first steering assist torque that is proportional to an integral value of a deviation between the target steering torque and the steering torque;
   a motor rotational angular velocity detector configured to detect a rotational angular velocity of a motor configured to apply a steering assist torque to the steering shaft;
   a second steering assist torque calculator configured to calculate a second steering assist torque that is proportional to the rotational angular velocity of the motor and acting in a direction of suppressing a return speed of a steering wheel when the steering wheel returns to a neutral position;
   an adder configured to calculate a motor steering assist torque of the motor based on a sum of the first steering assist torque and the second steering assist torque;
   a current driver configured to control current of the motor so that the steering assist torque of the motor matches the calculated motor steering assist torque, and
   further comprising a third steering assist torque calculator configured to calculate a third steering assist torque that is proportional to a deviation between a value obtained by multiplying the target steering torque set by the target steering torque setter by a correction gain, and the steering torque, wherein the adder is configured to calculate the motor steering assist torque based on a sum of the first steering assist torque, the second steering assist torque, and the third steering assist torque, the correction gain being more than zero and less than one.

2. The steering control device according to claim 1, further comprising a vehicle speed detector configured to detect a vehicle speed of a vehicle,
   wherein the first steering assist torque is obtained by being multiplied by an integral control gain and the second steering assist torque is obtained by being multiplied by a velocity control gain, and
   wherein one or more of the gains are changed based on the vehicle speed detected by the vehicle speed detector.

3. The steering control device according to claim 1,
   wherein the first steering assist torque is obtained by being multiplied by an integral control gain and the second steering assist torque is obtained by being multiplied by a velocity control gain, and
   wherein one or more of the gains are changed based on the rotational angular velocity of the motor.

4. The steering control device according to claim 1,
   wherein the first steering assist torque is obtained by being multiplied by an integral control gain and the second steering assist torque is obtained by being multiplied by a velocity control gain, and
   wherein one or more of the gains are changed based on the steering torque.

5. The steering control device according to claim 1, further comprising a vehicle speed detector configured to detect a vehicle speed of a vehicle,
   wherein the first steering assist torque is obtained by being multiplied by an integral control gain, the second steering assist torque is obtained by being multiplied by a velocity control gain, and the third steering assist torque is obtained by being multiplied by a proportional control gain, and
   wherein one or more of the gains are changed based on the vehicle speed detected by the vehicle speed detector.

6. The steering control device according to claim 1,
   wherein the first steering assist torque is obtained by being multiplied by an integral control gain, the second steering assist torque is obtained by being multiplied by a velocity control gain, and the third steering assist torque is obtained by being multiplied by a proportional control gain, and
   wherein one or more of the gains is changed based on the rotational angular velocity of the motor.

7. The steering control device according to claim 1,
wherein the first steering assist torque is obtained by being multiplied by an integral control gain, the second steering assist torque is obtained by being multiplied by a velocity control gain, and the third steering assist torque is obtained by being multiplied by a proportional control gain, and
wherein one or more of the gains are changed based on the steering torque.

8. The steering control device according to claim 1, further comprising:
a steering angular velocity detector configured to detect a steering angular velocity of the steering wheel; and
a fourth steering assist torque calculator configured to calculate a fourth steering assist torque that is proportional to the steering angular velocity,
wherein the adder is configured to calculate the motor steering assist torque based on a sum of the first steering assist torque, the second steering assist torque, the third steering assist torque, and the fourth steering assist torque.

9. The steering control device according to claim 1, further comprising:
a steering torque differential value detector configured to acquire a steering torque differential value;
a low-pass filter configured to extract a set frequency component including a steering frequency of a driver from the steering torque differential value; and
a fifth steering assist torque calculator configured to calculate a fifth steering assist torque that is proportional to the steering torque differential value of the extracted frequency component,
wherein the adder is configured to calculate the motor steering assist torque based on a sum of the first steering assist torque, the second steering assist torque, the third steering assist torque, and the fifth steering assist torque.

10. The steering control device according to claim 1, further comprising a vehicle speed detector configured to detect a vehicle speed of a vehicle,
wherein the first steering assist torque is obtained by being multiplied by an integral control gain, the second steering assist torque is obtained by being multiplied by a velocity control gain, and the third steering assist torque is obtained by being multiplied by a proportional control gain, and
wherein one or more of the gains are changed based on the vehicle speed detected by the vehicle speed detector.

11. The steering control device according to claim 1,
wherein the first steering assist torque is obtained by being multiplied by an integral control gain, the second steering assist torque is obtained by being multiplied by a velocity control gain, and the third steering assist torque is obtained by being multiplied by a proportional control gain, and
wherein one or more of the gains is changed based on the rotational angular velocity of the motor.

12. The steering control device according to claim 1,
wherein the first steering assist torque is obtained by being multiplied by an integral control gain, the second steering assist torque is obtained by being multiplied by a velocity control gain, and the third steering assist torque is obtained by being multiplied by a proportional control gain, and
wherein one or more of the gains are changed based on the steering torque.

13. The steering control device according to claim 1, further comprising:
a steering angular velocity detector configured to detect a steering angular velocity of the steering wheel; and
a fourth steering assist torque calculator configured to calculate a fourth steering assist torque that is proportional to the steering angular velocity,
wherein the adder is configured to calculate the motor steering assist torque based on a sum of the first steering assist torque, the second steering assist torque, the third steering assist torque, and the fourth steering assist torque.

14. The steering control device according to claim 1, further comprising:
a steering torque differential value detector configured to acquire a steering torque differential value;
a low-pass filter configured to extract a set frequency component including a steering frequency of a driver from the steering torque differential value; and
a fifth steering assist torque calculator configured to calculate a fifth steering assist torque that is proportional to the steering torque differential value of the extracted frequency component,
wherein the adder is configured to calculate the motor steering assist torque based on a sum of the first steering assist torque, the second steering assist torque, the third steering assist torque, and the fifth steering assist torque.

15. A steering assist torque control method to be used in a steering control device, the steering control device being configured to, depending on a deviation between a set target steering torque and a detected steering torque, set a steering assist torque of a motor configured to apply a steering assist torque to a steering shaft,
the steering assist torque control method comprising:
setting the steering assist torque of the motor based on a sum of a first steering assist torque, which is proportional to an integral value of the deviation between the set target steering torque and the detected steering torque, and a second steering assist torque, which is proportional to a rotational angular velocity of the motor and a third steering assist torque that is proportional to a deviation between a value obtained by multiplying the target steering torque by a correction gain and the steering torque, the correction gain being more than zero and less than one;
acting in a direction of suppressing a return speed of a steering wheel when the steering wheel returns to a neutral position; and
calculating the motor steering assist torque based on a sum of the first steering assist torque, the second steering assist torque, and the third steering assist torque.

* * * * *